(12) United States Patent
Kondo et al.

(10) Patent No.: US 8,204,414 B2
(45) Date of Patent: Jun. 19, 2012

(54) FASTENING STRUCTURE, BLADE STRUCTURE, DEVELOP UNIT, AND IMAGE FORMATION APPARATUS

(75) Inventors: Takafumi Kondo, Atsugi (JP); Hirokazu Kurihara, Atsugi (JP); Shinichi Tanaka, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 770 days.

(21) Appl. No.: 12/328,456

(22) Filed: Dec. 4, 2008

(65) Prior Publication Data

US 2009/0142106 A1    Jun. 4, 2009

(30) Foreign Application Priority Data

Dec. 4, 2007    (JP) ................................. 2007-313684

(51) Int. Cl.
G03G 15/09    (2006.01)
G03G 15/08    (2006.01)
(52) U.S. Cl. ........................................ 399/274; 399/284
(58) Field of Classification Search .................. 399/274, 399/284, 260
See application file for complete search history.

(56) References Cited

U.S. PATENT DOCUMENTS

| | | | |
|---|---|---|---|
| 2,321,755 A | | 6/1943 | Kost et al. |
| 4,803,752 A | * | 2/1989 | Kasama ...................... 15/256.51 |
| 5,489,974 A | * | 2/1996 | Kamaji et al. ............... 399/285 |
| 2005/0210654 A1 | | 9/2005 | Kawauchi et al. |
| 2007/0286673 A1 | | 12/2007 | Ishino et al. |
| 2008/0063439 A1 | * | 3/2008 | Kondo et al. ................. 399/284 |
| 2008/0069597 A1 | * | 3/2008 | Ishida et al. ................. 399/265 |

FOREIGN PATENT DOCUMENTS

| | | |
|---|---|---|
| DE | 103 14 544 A1 | 10/2004 |
| EP | 1 710 027 A2 | 10/2006 |
| EP | 1 837 094 A1 | 9/2007 |
| JP | 7-279658 | 10/1995 |
| JP | 2001-129623 | 5/2001 |
| JP | 3187103 | 5/2001 |
| JP | 2002-251067 | 9/2002 |
| JP | 2002-333801 | 11/2002 |
| JP | 2003-280364 | 10/2003 |
| JP | 2003-280475 | 10/2003 |
| JP | 3793370 | 4/2006 |
| JP | 2006-126764 | 5/2006 |
| JP | 2006-289399 | 10/2006 |
| JP | 2007-245233 | 9/2007 |
| JP | 2008-65011 | 3/2008 |

* cited by examiner

*Primary Examiner* — David Gray
*Assistant Examiner* — Rodney Bonnette
(74) *Attorney, Agent, or Firm* — Oblon, Spivak, McClelland, Maier & Neustadt, L.L.P.

(57) ABSTRACT

A fastening structure which fixes a doctor blade to a holder is provided, which includes a cylindrical portion provided on one surface of the holder with which a doctor blade is overlapped, a through hole having an inner diameter larger than an outer diameter of the cylindrical portion and penetrating through the doctor blade. In the fastening structure, while the cylindrical portion is inserted through the through hole with a gap between an outer circumference of the cylindrical portion and an inner circumference of the through hole, an end portion of the cylindrical portion is pressed to be expanded in an outer circumferential direction and then bent towards the doctor blade, to thereby fix the doctor blade to the holder by supporting it between the end portion and the one surface of the holder.

13 Claims, 29 Drawing Sheets

FASTENING STRUCTURE, BLADE STRUCTURE, DEVELOP UNIT, AND IMAGE FORMATION APPARATUS

CROSS REFERENCE TO RELATED APPLICATION

The present application is based on and claims priority from Japanese Patent Application No. 2007-313684, filed on Dec. 4, 2007, the disclosure of which is hereby incorporated by reference in its entirety.

BACKGROUND OF THE INVENTION

1. Field of the invention

The present invention relates to a fastening structure which fixes, with a holder, a plate-like member such as a doctor blade to maintain a certain thickness of a developer on the outer circumference of a developer roller of a develop unit such as a copier, a facsimile, or a printer. It also relates to a blade structure incorporating such a fastening structure, a develop unit incorporating such a blade structure, and an image formation apparatus incorporating such a develop unit.

2. Description of the Related Art

It is well known that an image formation apparatus as a printer comprises a develop unit (shown in FIG. 35, for example) which includes a blade structure composed of a developer roller to attract a two-component developer of a magnetic carrier and a toner or a one-component developer of a toner only onto its outer circumference to supply the developer to a latent image support body, as well as a doctor blade as a plate-like member to face the developer roller and maintain a certain thickness of the developer on the outer circumference of the developer roller.

A develop unit 100 shown in FIG. 35 includes a developer roller 101, a holder 102 facing the developer roller 101 and a doctor blade 103, and screw members 104 disposed with an interval in a longitudinal direction of the doctor blade 103. It is configured such that the doctor blade 103 is fastened on the holder 102 with the screw members 104 and brought in contact with the outer circumference of the developer roller 101 by a certain pressure F indicated by the arrow.

The doctor blade 103 is formed in a thin plate and functions to limit the amount of the developer on the outer circumference of the developer roller 101. The develop unit 100 in FIG. 35 is suitable for a one-component developer and limits the amount of the developer adsorbed on the outer circumference of the developer roller 101 by making the doctor blade 103 in contact therewith by pressure, for example.

In this type of develop unit 100, the doctor blade 103 is required to have uniform planarity or flatness because it has to evenly apply pressure to the developer roller 101 in an axial (longitudinal) direction thereof in order to control the amount of the developer on the developer roller 101 to be uniform in the axial direction.

However, the develop unit in FIG. 35 has a drawback that the doctor blade 103 exhibits great undulation and cannot attain designed straightness (linearity of a ridge line of the doctor blade in the longitudinal direction). This causes a non-uniform gap between the developer roller 101 and the doctor blade 103 in the longitudinal direction, resulting in insufficient friction to generate electric charges needed and formation of defective images.

Increasing the pressure F of the doctor blade 103 to the developer roller 101 may be a good way to solve this problem. However, with the increased pressure F, another problem may arise that the doctor blade 103 is likely to damage the developer roller 101 and shorten the longevity thereof.

In light of the above problems, Japanese Patent No. 3793370 (Document 1) discloses a blade structure to fasten a doctor blade onto a holder with a tightening torque gradually decreased from both ends to the center of the doctor blade.

Further, Japanese Laid-open Patent Application Publication No. 2003-280364 (Document 2) discloses a blade structure to fix a thin plate-like doctor blade to a holder by welding.

The inventors of the present application have proposed a fastening structure to fasten a thin plate-like doctor blade on a holder by plastic deformation of protrusions on the holder (disclosed in Japanese Laid-open Patent Application Publication No. 2007-245233 (Document 3), for example) and another fastening structure to fix a doctor blade to a holder by supporting it between the holder and a support plate (disclosed in Japanese Laid-open Patent Application Publication No. 2008-065011 (Document 4), for example).

Moreover, Japanese Laid-open Patent Application Publication Nos. 2001-129623 (Document 5) and No. 2006-126764 (Document 6), and Japanese Patent No. 3187103 (Document 7) disclose a blade structure to fix a doctor blade to a holder by plastic deformation of protrusions on the holder.

However, such blade structure and fastening structure still have their own problems. With the blade structure disclosed in Document 1, it is difficult to improve work efficiency since the doctor blade is fixed to the holder with plural screw members in a predetermined process while torques of the screw members are adjusted to gradually decrease from both ends of the holder to the center thereof.

As for the blade structure disclosed in Document 2, in order to prevent thermal distortion of the doctor blade by welding and maintain the straightness and planarity of the doctor blade, outputs of a welding machine are finely adjusted. However, there are some disadvantages that the output control of the welding machine is complex and difficult, requiring a great deal of time for manufacture preparation, and weld defects will occur due to variance in the outputs of the welding machine in mass production process.

Also, welding greatly increases manufacture cost and unit price of the blade structure. When the holder and the doctor blade are made of different materials, their linear expansion coefficients differ from each other, causing distortion and undulation in the doctor blade at welded portions and deteriorating the planarity thereof. Fixing the doctor blade to the holder by use of an adhesive faces a similar problem.

Further, the blade structure including the fastening structure disclosed in Document 4 uses the support plate for the purpose of preventing undulation in the doctor blade. The provision of the support plate disadvantageously increases the number of components and the number of assembly processes, leading to a complex components inventory control and a rise in manufacture cost for the blade structure.

For manufacturing a blade structure with use of the fastening structure in Document 3, it is necessary to make a cut in a convex portion of the holder with a punch (first pressing tool) when fixing a doctor blade to a holder. Force from the punch may adversely affect a flatness of the surface of the holder with which the doctor blade is overlapped, and deteriorates the planarity thereof, which leads to locally decreasing the planarity of the doctor blade pressed onto the holder. For thin doctor blades with low rigidity, this local low planarity may cause undulation in the edge of the doctor blade and disable the function of the blade structure.

Furthermore, the force from the punch making a cut in the convex portion may expand the bottom end of the convex portion. When the expanded convex portion comes in contact with the inner circumference of a through hole of the doctor blade, a great undulation will occur in the doctor blade, also disabling the function of the blade structure. A larger through hole can be a solution to this problem but at the same time it may cause insufficient strength for fastening the blade on the holder since an area of the cut portion to press the holder is narrowed.

Also, it is known that for fastening a thin plate in thickness of 0.5 mm or less on the holder without undulation in the plate, a force to sandwich the plate is necessary as when a safety razor is set to a holder.

For example, as shown in FIGS. 36, 37, a thin plate 105 is provided with through holes 106. When a force to expand the through holes 106 or the thin plate is applied to fasten them, undulation occurs in the thin plate by a little amount of force. It is known that in terms of undulation, a thin plate in thickness of 0.5 mm or less is unsusceptible to a force from a direction indicated by the arrows in FIG. 36 but susceptible to even a weak force from a direction indicated by the arrows in FIG. 37.

Given this fact, in manufacturing a blade structure by use of a metal plate with protrusions disclosed in Document 5, undulation may occur in a doctor blade due to a force arising from molding an expanded cylindrical portion. This may impair the function of the blade structure. Further, the undulation is conspicuous when the doctor blade as a plate-like member is in thickness of 0.5 mm or less.

There is another known method to fasten a plate-like member by making a cylindrical portion by extrusion, inserting a through hole of the plate-like member into the cylindrical portion, and then pressing down the cylindrical portion. However, such a method cannot also realize fastening the plate-like member without occurrence of undulation since expanding the cylindrical portion when fastening applies a force to expand the inner circumference of the through hole of the plate-like member.

The blade structures disclosed in Documents 6 and 7 cannot achieve fastening the thin plate without undulation either for the same reason as above.

Further, in case of molding a metal plate integrated with the cylindrical portion in Document 5, a very great force to place the metal plate between dies is needed. Otherwise, base materials of the cylindrical portion may not be protruded to form the cylindrical portion as it is supposed to be, and may flow to an outer circumferential direction, resulting in molding failures. In this case, the molding failures cause undulation in the doctor blade when attaching the blade to the holder.

SUMMARY OF THE INVENTION

In view of solving the above problems, an object of the present invention is to provide a fastening structure and a blade structure which allow a plate-like member to be attached to a holder without causing undulation in the plate-like member and achieve improved work efficiency, as well as to provide a develop unit incorporating these structures and an image formation apparatus incorporating the develop unit.

According to one aspect of the present invention, a fastening structure which fixes a plate-like member to a holder comprises a cylindrical portion provided on one surface of the holder with which a plate-like member is overlapped; a through hole having an inner diameter larger than an outer diameter of the cylindrical portion and penetrating through the plate-like member, wherein while the cylindrical portion is inserted through the through hole with a gap between an outer circumference of the cylindrical portion and an inner circumference of the through hole, an end portion of the cylindrical portion is pressed to be expanded in an outer circumferential direction and then bent towards the plate-like member, to thereby fix the plate-like member to the holder by supporting the plate-like member between the end portion and the one surface of the holder.

In features of this aspect, the cylindrical portion is in a cylindrical form and stands from the one surface of the holder, and a bottom portion of the cylindrical portion is sealed with the one surface.

In the other features of this aspect, the cylindrical portion comprises a large diameter portion connected with the one surface of the holder and facing the inner circumference of the through hole with a gap, and a small diameter portion connected with the large diameter portion and having a smaller diameter than that of the large diameter portion.

In the other features of this aspect, wherein the cylindrical portion comprises a columnar portion connected with the one surface of the holder and facing the inner circumference of the through hole with a gap, and a tubular portion connected with the columnar portion.

In the other features of this aspect, a planar shape of the cylindrical portion and that of the through hole are the same.

In the other features of this aspect, the cylindrical portion includes a slit extending in a direction intersecting with the one surface of the holder.

In the other features of this aspect, the fastening structure further comprises a concave groove formed in a ring-like shape on the one surface of the holder and receiving the cylindrical portion.

In the other features of this aspect, the fastening structure further comprises a taper concave portion on a back side of the cylindrical portion, to decrease a thickness of the holder gradually in the outer circumference direction.

According to another aspect of the present invention, a blade structure comprises the above-described fastening structure, a long holder, and a long thin plate-like blade as a plate-like member overlapped with one surface of the holder.

In features of this aspect, the blade structure comprises a plurality of fastening structures with an interval in a longitudinal direction of the holder and the thin plate-like blade.

In the other features of this aspect, the plurality of fastening structures are provided in the longitudinal direction of the holder and the thin plate-like blade with an equal interval.

According to another aspect of the present invention, a develop unit comprises a developer roller absorbing a developer onto its outer circumference and delivering the developer to a develop area opposing an image support body; and the above-described blade structure which maintains a certain thickness of the developer on the outer circumference of the developer roller.

According to another aspect of the present invention, an image formation apparatus comprises an image support body and the above-described develop unit.

DETAILED DESCRIPTION OF THE PREFERRED EMBODIMENT

Figure 1:
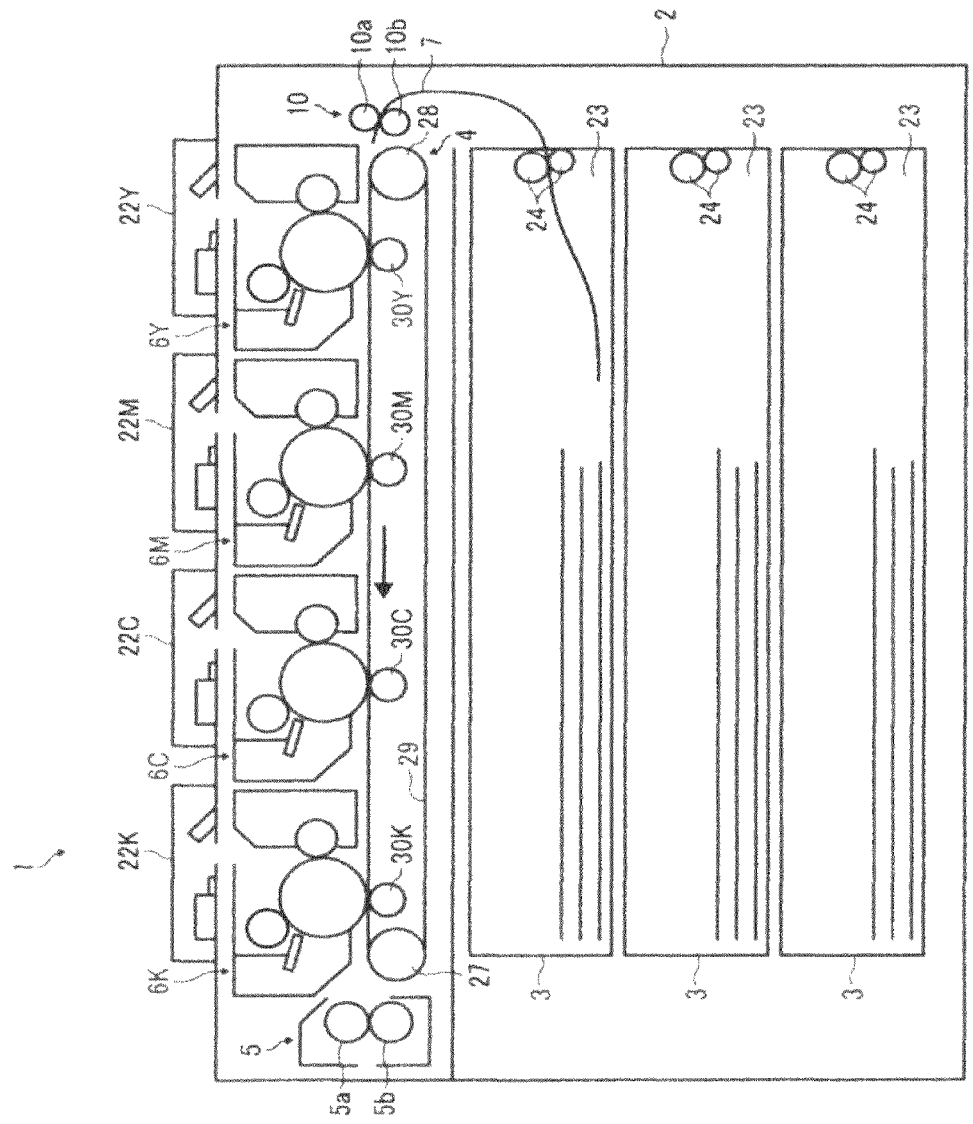
FIG. 1 is a cross sectional view of an image formation apparatus according to a first embodiment of the present invention.
Figure 2:
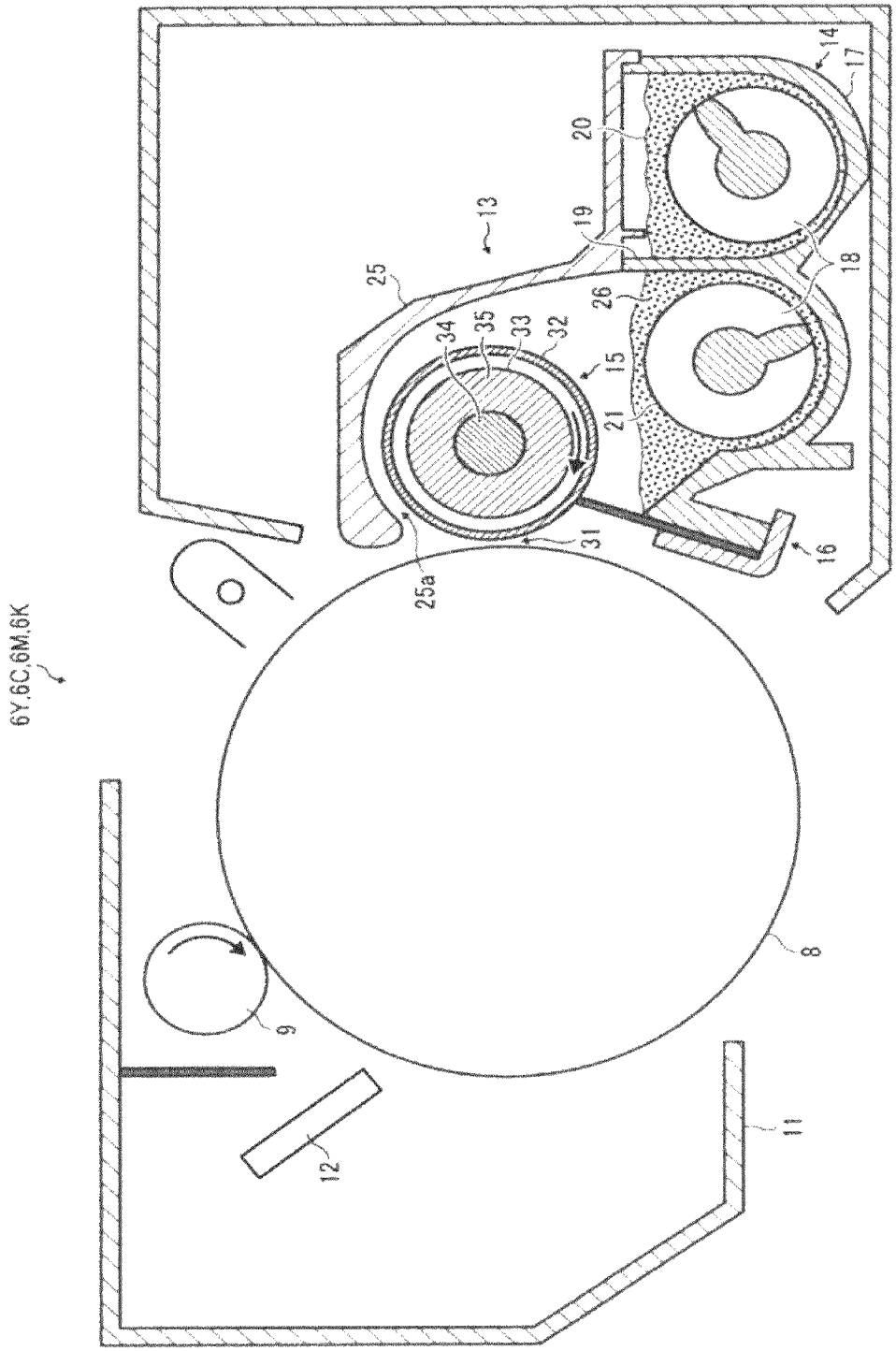
FIG. 2 is a cross sectional view of a process cartridge of the image formation apparatus shown in FIG. 1.
Figure 3:
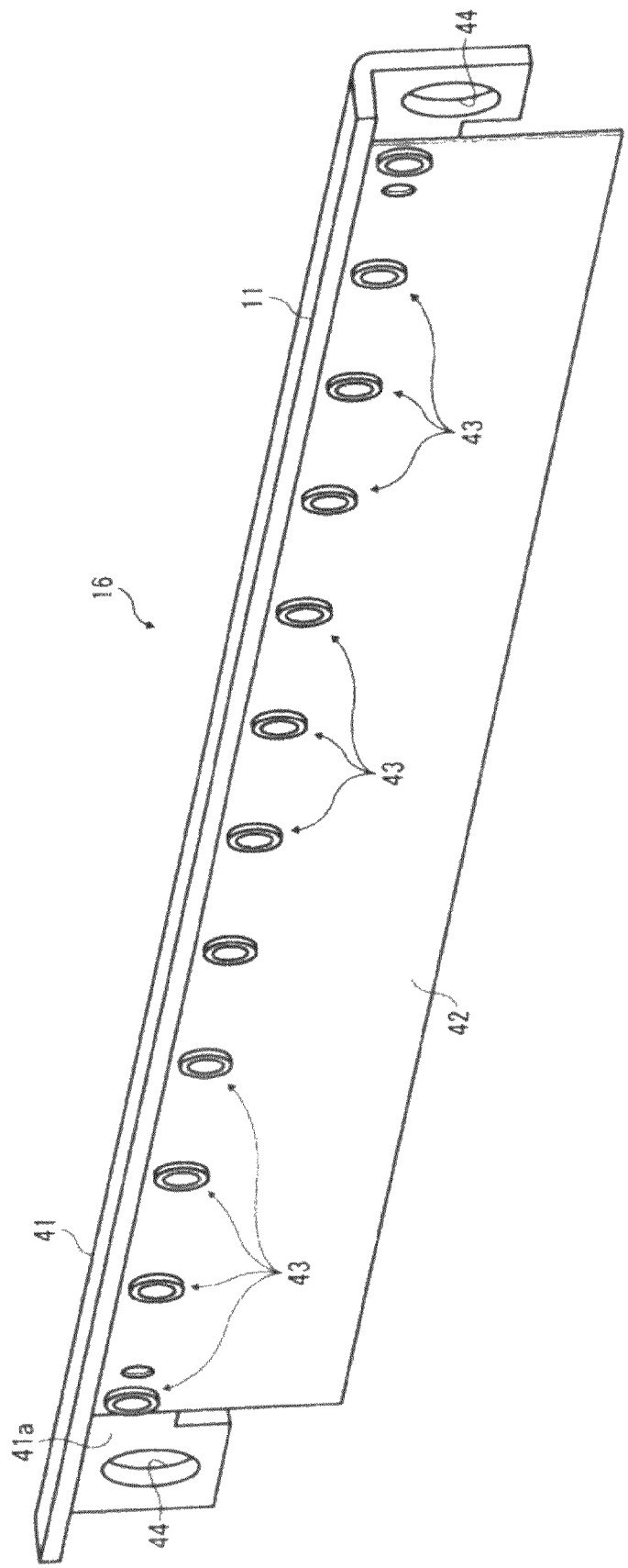
FIG. 3 is a side view of a blade structure of a develop unit of the process cartridge shown in FIG. 2.
Figure 4:
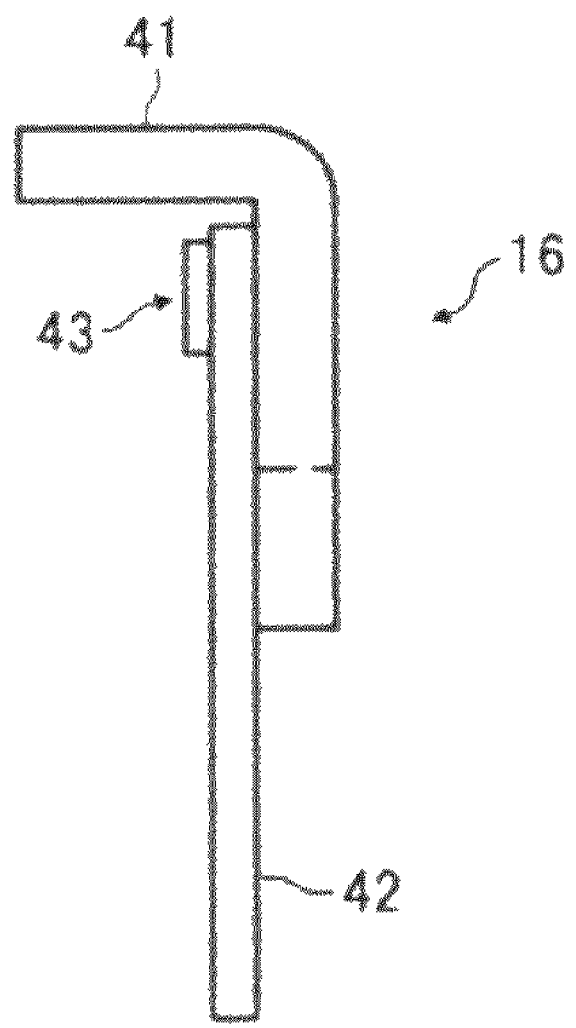
FIG. 4 is a side view of the blade structure shown in FIG. 3.

Hereinafter, the first embodiment of the present invention will be described with reference to FIGS. 1 to 15. FIG. 1 is a cross sectional view of an image formation apparatus 1 according to the first embodiment of the present invention, FIG. 2 is a cross sectional view of a process cartridge of the image formation apparatus shown in FIG. 1, and FIG. 3 is a perspective view of a blade structure of a develop unit of the process cartridge shown in FIG. 2.

The image formation apparatus 1 forms a color image of yellow (Y), magenta (M), cyan (C), black (K) on a sheet of paper 7 as a transfer member (FIG. 1). Note that hereinafter, units associated with the 4 colors will be given numeric codes with Y, M, C, K in ending.

As shown in FIG. 1, the image formation apparatus 1 at least comprises an apparatus body 2, paper feed units 3, a resist roller pair 10, a transfer unit 4, a fuser unit 5, four laser write units 22Y, 22M, 22C, 22K, and four process cartridges 6Y, 6M, 6C, 6K.

The apparatus body 2 has a boxed shape and mounted on a floor or the like, for example. It accommodates the paper feed units 3, resist roller pair 10, transfer unit 4, fuser unit 5, four laser write units 22Y, 22M, 22C, 22K, and four process cartridges 6Y, 6M, 6C, 6K.

The plurality of paper feed units 3 are provided at the bottom of the apparatus body 2, and each comprises a detachable paper feed cassette 23 incorporating piled-up sheets of paper 7, and a paper feed roller 24. The paper feed rollers 24 are pressed on the uppermost sheet of paper 7 in the paper feed cassettes 23, and transmit the uppermost sheet to a gap between a later-described carrier belt 29 of the transfer unit 4 and photoconductor drums 8 of later-described develop units 13 of the process cartridges 6Y, 6M, 6C, 6K.

The resist roller pair 10 is provided on a carrier path of the sheets of paper 7 from the paper feed units 3 to the transfer unit 4 and composed of a pair of rollers 10a, 10b. The resist roller pair 10 places the paper 7 between the rollers 10a, 10b and transmits it to a gap between the transfer unit 4 and the process cartridges 6Y, 6M, 6C, 6K at a timing when toner images are transferred.

The transfer unit 4 is provided above the paper feed units 3, and comprises a drive roller 27, a driven roller 28, a carrier belt 29, and transfer rollers 30Y, 30M, 30C, 30K. The drive roller 27 is disposed downstream of a carrier direction of the paper 7 and rotated by a motor or the like as a drive source. The driven roller 28 is rotatably supported by the apparatus body 2 and placed upstream of the carrier direction of the paper 7. The carrier belt 29 has a ring-like shape with no ends and is hung over both of the drive and driven rollers 27, 28.

Rotation of the drive roller 27 circulates the carrier belt 29 around the drive roller 27 and the driven roller 28 clockwise in the drawing.

The transfer rollers 30Y, 30M, 30C, 30K place the paper 7 on the carrier belt 29 between the process cartridges 6Y, 6M, 6C, 6K and the photoconductor drums 8, respectively, and press it onto the surfaces of the photoconductor drums 8 of the process cartridges to transfer toner images on the paper 7. The transfer unit 4 then transmits the paper 7 with the toner images thereon to the fuser unit 5.

The fuser unit 5 is disposed downstream of the carrier direction of the paper 7 in the transfer unit 4, and comprises a pair of rollers 5a, 5b placing the paper 7 therebetween. The fuser unit 5 fuses the transferred toner images on the paper 7 by pressing and heating the paper 7 carried from the transfer unit 4.

The laser write unit 22Y, 22M, 22C, 22K are disposed at the top of the apparatus body 2, corresponding to the process cartridges 6Y, 6M, 6C, 6K. They illuminate with laser beams the surfaces of the photoconductor drums 8 which are uniformly charged by later described charge rollers 9 of the process cartridges 6Y, 6M, 6C, 6K to form electrostatic latent images thereon.

The process cartridges 6Y, 6M, 6C, 6K are placed between the transfer unit 4 and the laser write unit 22Y, 22M, 22C, 22K, and are in parallel with each other in the carrier direction of the paper 7. They are detachable from the apparatus body 2.

As shown in FIG. 2, the process cartridges 6Y, 6M, 6C, 6K each comprise a charge roller 9, a photoconductor drum 8 (image support body), a cleaning blade 12 as a cleaning device, and a develop unit 13. The image formation apparatus 1 is comprised of at least the charge rollers 9, photoconductor drums 8, cleaning blades 12, and develop units 13.

Each cartridge case 11 is detachable from the apparatus body 2, and accommodates the charge roller 9, cleaning blade 12, and develop unit 13. The charge rollers 9 uniformly charge the surfaces of the photoconductor drums 8.

The photoconductor drums 8 are arranged with an interval from developer rollers 15 of the develop units 13. They are in columnar or cylindrical form and rotatable. On their surfaces electrostatic latent images are formed by the respective laser write unit 22Y, 22M, 22C, 22K. A toner is absorbed onto the electrostatic latent images on the photoconductor drums 8 to develop toner images, which are to be transferred to the sheet of paper 7 on the carrier belt 29. The cleaning blades 12 remove remnant toners from the surfaces of the photoconductor drums 8 after the transfer of the toner images.

As shown in FIG. 2, each develop unit 13 comprises at least developer supply unit 14, a case 25, a developer roller 15 (developer support body), and a blade structure 16.

Each developer supply unit 14 comprises a tank 17 and a pair of agitator screws 18 as an agitator. The tank 17 has a boxed shape and substantially the same length as that of the photoconductor drum 8. The tank 17 includes a bulkhead 19 extending in the longitudinal direction thereof which divides the tank 17 into a first space 20 and a second space 21. The first and second spaces are in communication with each other at their ends.

The tank 17 contains the developer 26 in the first and second spaces 20, 21. The developer 26 is made of toner only and is supplied to one end of the first space 20 which is distant from the developer roller 15, when appropriate. The toner is spherical fine particles manufactured by emulsion polymerization or suspension polymerization. Toner can be manufactured by grinding a lump of synthetic resin in which various dyes or pigments are mixed and dispersed, or pulverization. The mean particle size of the toner is 3 μm or more and 7 μm or less.

The agitator screws 18 are contained in the first and second spaces, respectively.

The longitudinal direction thereof is in parallel with that of the tank 17, developer roller 15, photoconductor drum 8. The agitator screws 18 are rotatable around an axis and their rotation agitates the toner and carries the developer 26 along the axis.

In FIG. 2 the agitator screw 18 in the first space 20 carries the developer 26 from the above-described one end to the other end while that in the second space 20 carries it from the other end to the one end.

With the above configuration, the developer supply unit 14 agitates and carries the toner supplied to the one end of the first space 20 to the other end of the second space 21 via the other end of the first space 20. Thereafter, the developer supply unit 14 agitates the toner in the second space 21, carries it in the axial direction and supplies it to the surface of the developer roller 15.

The case 25 in a boxed shape accommodates the tank 17 of the developer supply unit 14, the developer roller 15 and others. The case 25 comprises an opening 25a at a position facing the photoconductor drum 8.

The developer roller 15 in columnar form is provided between the photoconductor drum 8 and the second space 21 near the opening 25a, and it is parallel to the photoconductor drum 8 and tank 17. There is a gap between the developer roller 15 and photoconductor drum 8. The gap forms a develop area 31 to form toner images by absorbing the toner onto the photoconductor drum 8 and developing electrostatic latent images. In the develop area 31 the developer roller 15 and photoconductor drum 8 face each other.

The developer roller 15 as shown in FIG. 2 comprises a columnar metal core 34, a cylindrical magnetic roller 33, and a developer sleeve 32 as a non-magnetic cylinder. The metal core 34 is non-rotatable and fixed to the case 25, and the longitudinal direction thereof is parallel to that of the photoconductor drum 8.

The magnetic roller 33 in cylindrical form is made of a magnetic material and comprises a plurality of fixed magnetic poles (not shown). It is non-rotatable and fixed around the outer periphery of the metal core 34.

The fixed magnetic poles are long stick-like magnets extending to the longitudinal direction of the roller body 35 and developer roller 15, and attached to the roller body 35 of the magnetic roller 33. They are disposed over the entire length of the roller body 35. The magnetic roller 33 is contained in the developer sleeve 32.

One of the fixed magnetic poles faces the agitator screw 18 and generates a magnetic force on the outer periphery of the developer sleeve 32 or the developer roller 15 to thereby absorb the developer 26 thereon from the second space 21 of the tank 17.

Another one of the fixed magnetic poles faces the photoconductor drum 8 and generates a magnetic force on the outer periphery of the developer sleeve 32 or the developer roller 15 to form a magnetic field between the developer sleeve 32 and the photoconductor drum 8. This fixed magnetic pole forms a magnetic brush from the magnetic field to thereby deliver the toner of the developer 26 on the developer sleeve 32 to the photoconductor drum 8.

Other fixed magnetic poles are provided to carry the developer 26 from the tank 17 of the developer supply unit 14 to the develop area 31 before development or from the develop area 31 to the tank 17 after development.

The magnetic roller 33 with the fixed magnetic poles absorbs the developer 26 onto the outer periphery of the developer sleeve 32 and places the toner in layers along magnetic lines generated from the fixed magnetic poles to form chain-like clusters (chain formation) on the outer periphery of the developer sleeve 32. The developer sleeve 32 absorbs the developer 26 on the developer sleeve 32 by the magnetic force of the magnetic roller 33.

The developer sleeve 32 has a cylindrical form as shown in FIG. 2 and contains the magnetic roller 33 to be rotatable around the axis. The developer sleeve 32 rotates so that the inner periphery thereof faces the fixed magnetic poles in order. It is made of non-magnetic materials such as aluminum alloy, stainless steel (SUS).

According to the present embodiment, the developer sleeve 32 comprises a large number of variously elliptic concaves on the outer periphery which are of two kinds, ones whose longitudinal direction is the axial direction of the developer sleeve 32 and ones whose longitudinal direction is the circumferential direction thereof. The number of concaves long in the axial direction is larger than that of concaves long in the circumferential direction. Further, the lengths (major axis) of the concaves in the longitudinal direction are 0.05 mm or more and 0.3 mm or less while the lengths (minor axis) thereof in the width direction are 0.02 mm or more and 0.1 mm or less.

To form the concaves, a base tube constituting the developer sleeve 32 is placed together with a medium in a rotary magnetic field. Then, the medium is revolved by the magnetic field and the revolving medium is rotated around the base tube and collided therewith. The medium is made of a relatively large cut wire (metal wire cut in short length) of a magnetic material such as an austenitic or martensitic stainless steel. Its outer diameter is 0.5 mm or more and 1.2 mm or less and L (entire length)/D (outer diameter) is 4 or more and 10 or less.

Thus, the concaves are formed by making the medium collide with the base tube, the same as in the known blasting process. The variously elliptic concaves contribute to a good stable image formation without unevenness over a long time since the surface irregularity with a large pitch leads to a large chain formation in each of the concaves in which the developer 26 is unlikely to slip and which are unsusceptible to abrasion.

Next, the blade structure according to the present invention will be described. The blade structure 16 is disposed between the opening 25a of the case 25 of the develop unit 13 and the photoconductor drum 8, and comprises a holder 41, a thin doctor blade (plate-like member) 42, and a plurality of fastening structures 43, as shown in FIGS. 3 through 8.

Figure 5:
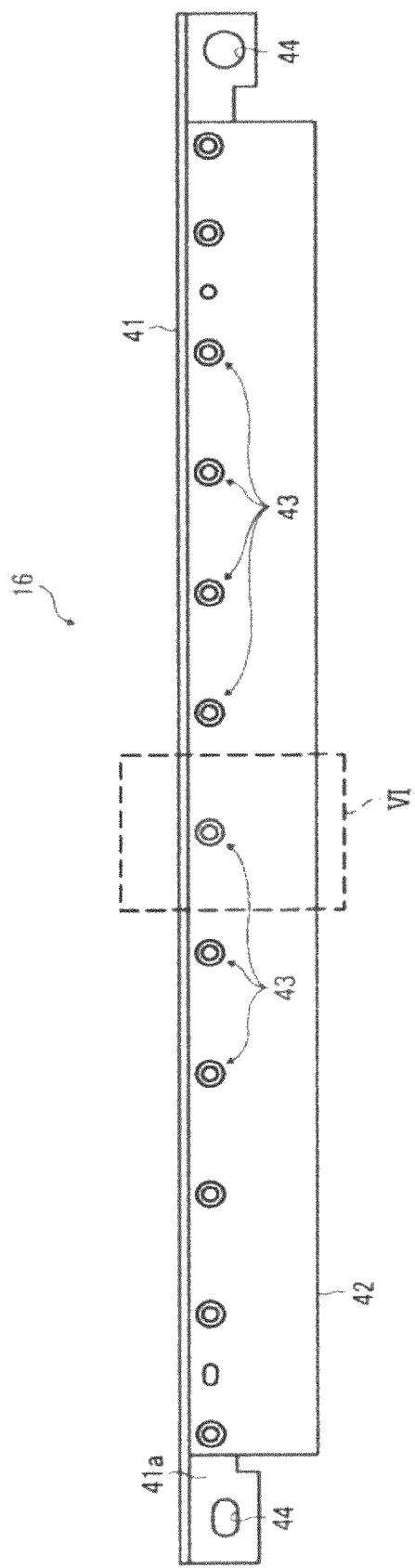
FIG. 5 is a front view of the blade structure shown in FIG. 3.
Figure 6:
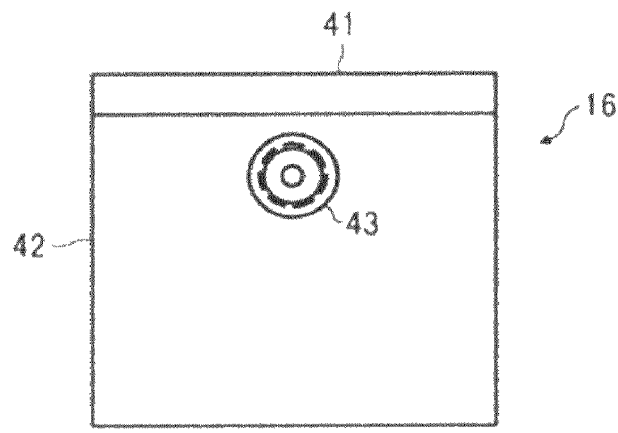
FIG. 6 is an enlarged front view of a VI portion of the blade structure shown in FIG. 5.
Figure 7:
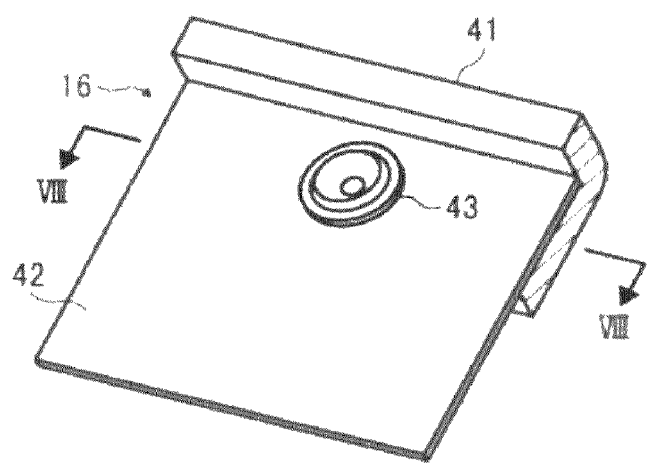
FIG. 7 is a perspective view of an essential part of the blade structure shown in FIG. 5.

The holder 41 in long belt-like form is made of plastically deformable materials (metal or the like). It is disposed so that its longitudinal direction is parallel to that of the developer roller 15. As shown in FIGS. 3 and 5, the holder 41 comprises screw holes 44 at both ends for fixing the blade structure 16 to the case 25 of the develop unit 13 and the cases 11 of the process cartridges 6Y, 6M, 6C, 6K.

The doctor blade 42 is formed in a thin plate-like form in thickness of about 0.5 mm, for example. It is disposed on one surface 41a of the holder 41 so that its longitudinal direction is parallel to that of the developer roller 15. The doctor blade 42 is fixed to the holder 41 by the fastening structures 43 with its edges protruding to the developer roller 15 from the holder 41.

The doctor blade 42 is fixed to the holder 41 with its one end pressed onto the outer periphery of the developer sleeve 32 of the developer roller 15. The doctor blade 42 functions to limit the thickness of the developer on the developer sleeve 32 to a certain amount to maintain the certain amount of the developer 26 to be carried to the develop area 31 and as well as to charge the developer 26 on the developer sleeve 32 by friction.

The fastening structures 43 as shown in FIGS. 3 and 5 are arranged with an interval in the longitudinal direction of the holder 41 and the doctor blade 42. In the drawings the number of the fastening structures 43 is 12 and they are arranged with an equal interval.

In FIG. 4 and FIGS. 6 to 8 the fastening structures 43 each comprise a cylindrical portion 45 provided on the one surface 41a of the holder 41, a columnar concave portion 46 and a through hole 47 of the doctor blade 42. The cylindrical portion 45 stands from the one surface 41a before bending (later described). The planar shape thereof is circular. The bottom portion of the cylindrical portion 45 is sealed with the one surface 41a of the holder 41. The cylindrical portion 45 is molded by extrusion molding (a kind of press work) by which a part of a base material of the holder 41 is extruded from the one surface 41a.

Figure 9:
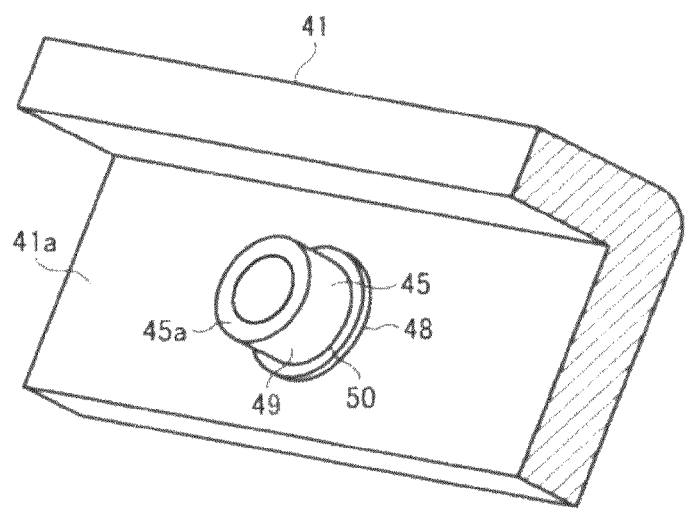
FIG. 9 is a perspective view of a cylindrical portion of the blade structure in FIG. 3 before molded.
Figure 11:
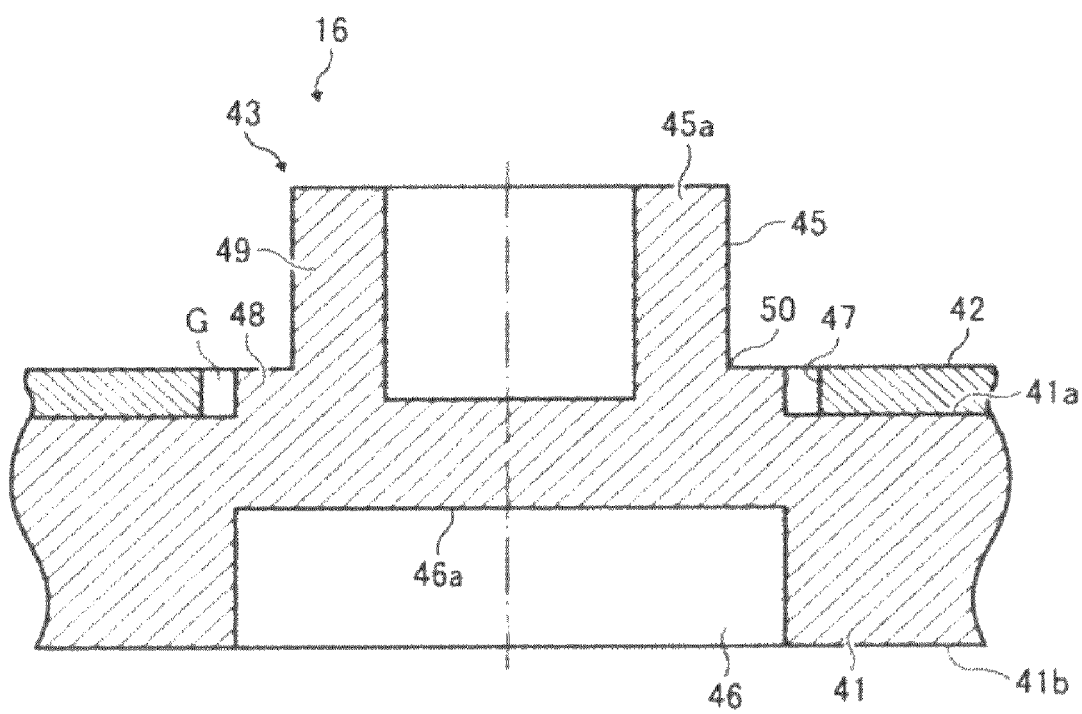
FIG. 11 is a cross sectional view of a holder of the blade structure in FIG. 10 on which a doctor blade is disposed.

Further, the cylindrical portion 45 before bending as in FIGS. 9 and 11 integrally comprises a large diameter portion 48 and a small diameter portion 49 which are connected with each other in tandem. The large and small diameter portions 48, 49 have a cylindrical form and their inner diameters are equal. The large diameter portion 48 is connected with the one surface 41a of the holder 41 and stands therefrom. The small diameter portion 49 is connected with the large diameter portion 48 and its outer diameter is smaller than that of the large diameter portion 48. A step 50 is formed between the large and small diameter portions 48, 49. The thickness of the large diameter portion 48 is substantially equal to that of the doctor blade 42.

The columnar concave portion 46 is formed in concavity in the other surface 41b of the holder 41, which is at the back side of the cylindrical portion 45. Its planar form is cylindrical and its bottom surface 46a is in parallel with the other surface 41b. The inner diameter thereof is equal to the outer diameter of the large diameter portion 48 of the cylindrical portion 45.

The through hole 47 is arranged at a position to correspond with the cylindrical portion 45, and the inner diameter thereof is larger than the step 50. It has a circular planar shape which is the same as that of the cylindrical portion 45.

Figure 12:
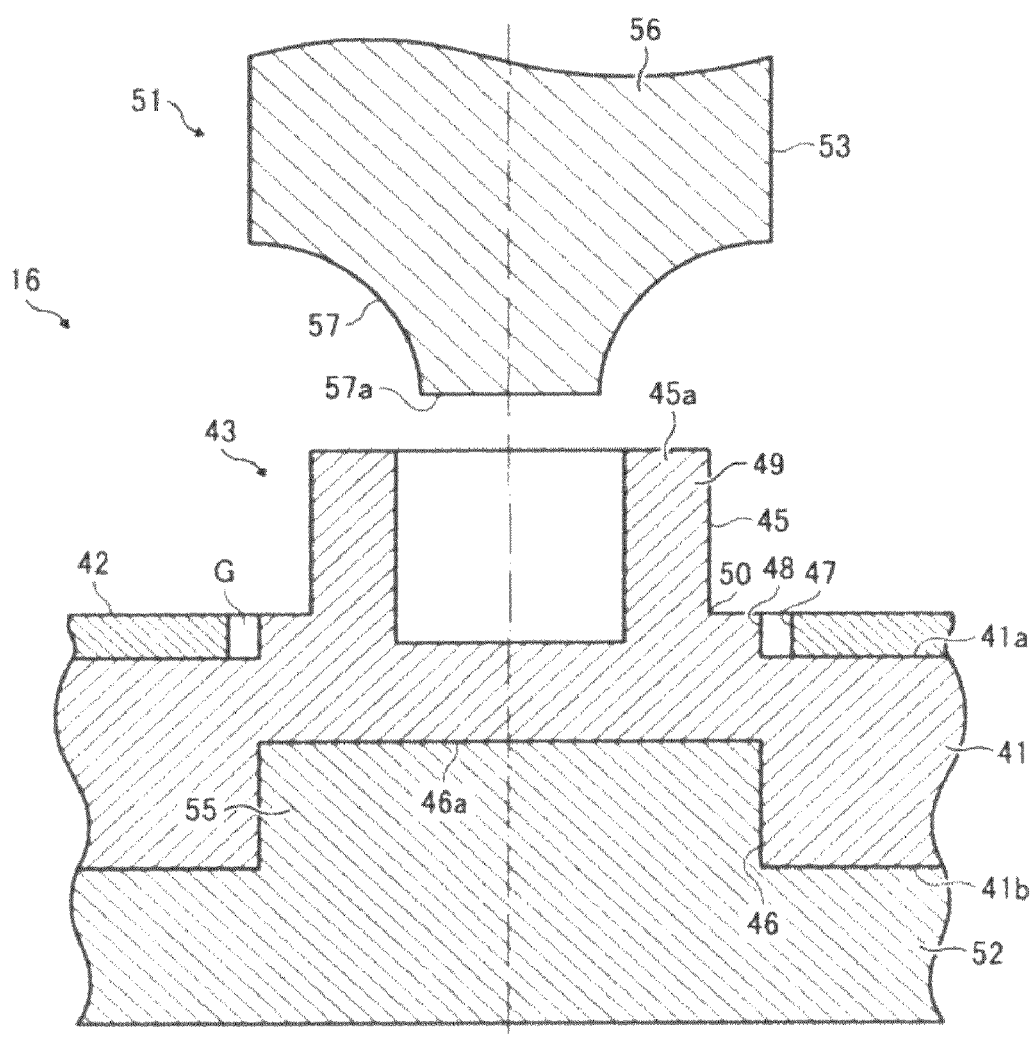
FIG. 12 is a cross sectional view of the holder and doctor blade in FIG. 11 positioned between a die and a first punch.
Figure 14:
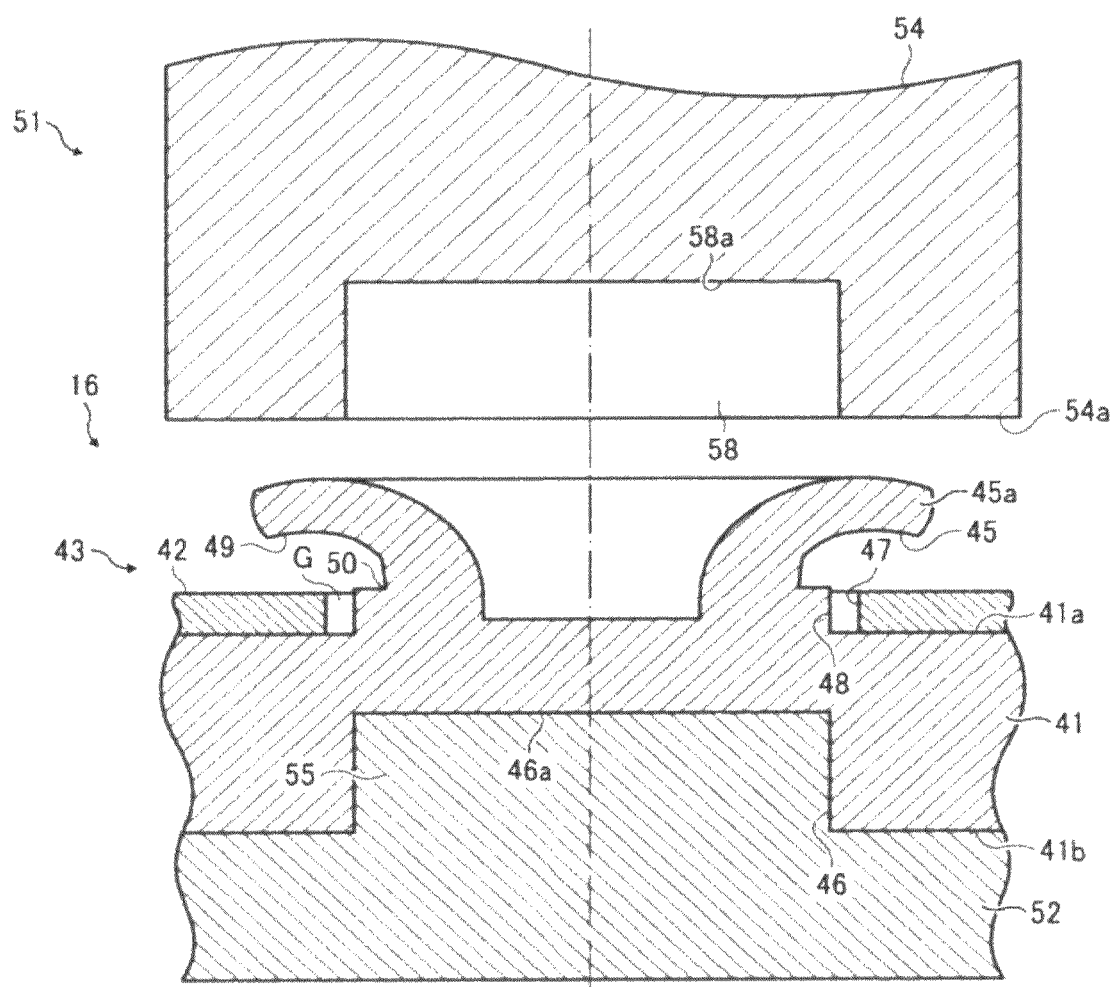
FIG. 14 is a cross sectional view of the holder and doctor blade in FIG. 13 positioned between a die and a second punch.

In each fastening structure 43, with a die set 51 shown in FIGS. 12, 14, the cylindrical portion 45 is inserted through the through hole 47. While the doctor blade 42 is overlapped with the one surface 41a of the holder 41, the end portion 45a of the cylindrical portion 45 is pressed and expanded in the outer circumferential direction thereof with a gap between the outer circumference of the large diameter portion 48 of the cylindrical portion 45 and the inner circumference of the through hole 47. Thereafter, the end potion 45a is bent towards the doctor blade 42 to sandwich the doctor blade 42 between the end portion 45a and the one surface 41a of the holder 41. This allows the doctor blade 42 to be supported by the surfaces of the end portion 45a of the cylindrical portion 45 and the holder 41. Here, a gap G is formed between the outer circumference of the large diameter portion 48 and the inner circumference of the through hole 47.

The die set 51 is comprised of a die 52 (bottom part of FIG. 12) on which the holder 41 is placed, a first punch 53 (FIG. 12, first pressing tool) opposing the die 52, and a second punch 54 (FIG. 14, second pressing tool) opposing the die 52. The die 52 has a protrusion 55 on its surface whose outer diameter is equal to the inner diameter of the columnar concave portion 46.

As shown in FIG. 12, the first punch 53 is comprised of a columnar punch body 56 and a bending portion 57 provided at end of the punch body 56. The punch body 56 is disposed so that its longitudinal direction is orthogonal to the surface of the die 52. The punch body 56 or the first punch 53 is able to get close to/distance away from the die 52 with use of a not-shown cylinder.

The bending portion 57 is formed in convexity from the top end of the punch body 56. As it protrudes therefrom, its outer diameter decreases such as a mortar. The top surface 57a thereof is in circular form whose outer diameter is smaller than the inner diameter of the cylindrical portion 45.

The second punch 54 in thick plate is disposed in parallel with the surface of the die 52, and is able to get close to/distance away from the die 52 with use of a not-shown cylinder.

The second punch 54 comprises a concavity 58 on a top surface 54a facing the die 52. The planar surface of the concavity 58 is circular and its inner diameter is larger than that of the through hole 47 while the bottom surface 58a thereof is flat and parallel to the top surface 54a of the second punch 54. Either the first or second punches 53, 54 is chosen and disposed above the die 52 to get in contact therewith.

Figure 10:
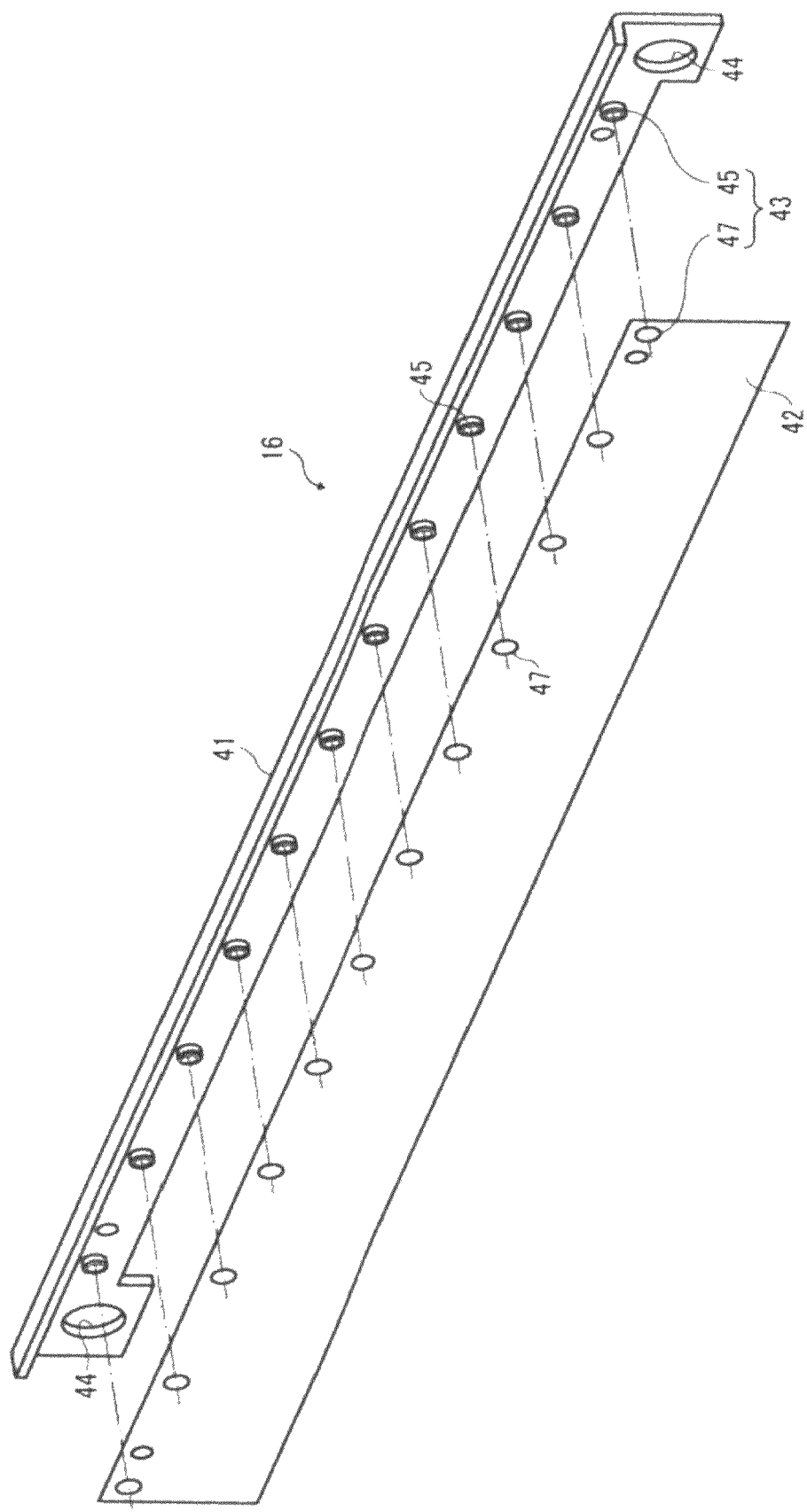
FIG. 10 is a perspective exploded view of the blade structure in FIG. 3.

The blade structure 16 is fastened with the above fastening structures 43 as follows. First, a part of a base material of the holder 41 is pressed out from the one surface 41a by extrusion molding to form the cylindrical portions 45 as shown in FIG. 9. Next, the doctor blade 42 is overlapped with the one surface 41a of the holder 41 by inserting the cylindrical portions 45 through the through holes 47 as shown in FIGS. 10, 11. This forms a gap G between the outer circumference of the large diameter portion 48 of each cylindrical portions 45 and the inner circumference of each through hole 47.

Then, the holder 41 and the doctor blade 42 are disposed on the die 52, and the first punch 53 faces the die 52 and gets in contact therewith. Here, the doctor blade 42, cylindrical portion 45, die 52, and first punch 53 are coaxially disposed and the protrusion 55 is inserted into the columnar concave portion 46.

When the first punch 53 comes close to the die 52, the bending portion 57 thereof is inserted into the cylindrical portion 45 and the end portion 45a of the cylindrical portion 45 is brought in contact with the outer circumference of the bending portion 57. Then, the end portion 45a of the cylindrical portion 45 is pressed by the outer circumference of the bending portion 57 and expanded in the outer circumferential direction of the cylindrical portion 45 as the first punch 53 further approaches the die 52. Thereby, the cylindrical portion 45 is deformed from the step 50 between the large and small diameter portions 48, 49 as a starting point.

Since the outer diameter of the top surface 57a of the bending portion 57 is set to equal to the inner diameter of the cylindrical portion 45, the gap between the outer circumference of the large diameter portion 48 of the cylindrical portion 45 and the inner circumference of the through hole 47 can be maintained when the top surface 57a comes close to the bottom surface 46a of the cylindrical portion 45. The first punch 53 is moved to be closer to the die 52 until the outer diameter of the expanded end portion of the cylindrical portion 45 at least becomes larger than the inner diameter of the through hole 47 of the doctor blade 42.

Figure 13:
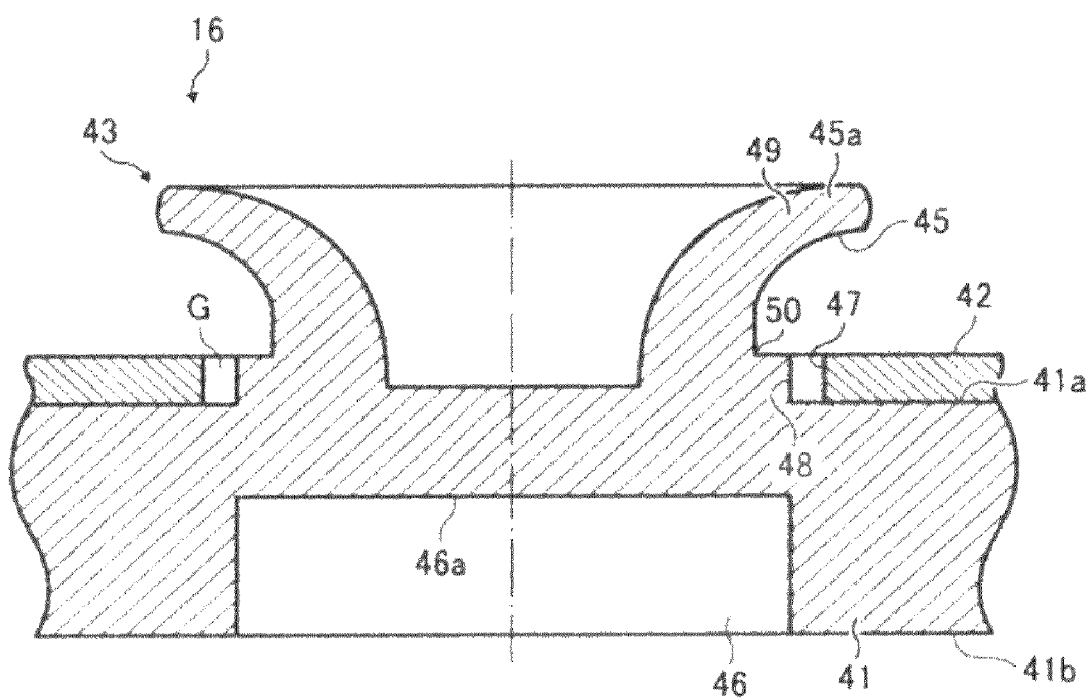
FIG. 13 is a cross sectional view of an end portion of the cylindrical portion expanded in outer circumferential direction by the first punch in FIG. 12.

As shown in FIG. 13, with the gap maintained between the outer circumference of the large diameter portion 48 and the inner circumference of the through hole 47, the end portion 45a of the cylindrical portion 45 is expanded in the outer circumferential direction. Further, the step 50 is increased in diameter as the cylindrical portion 45 is deformed, and the amount of the gap G is almost unchanged before and after molding.

Next, the second punch 54 is disposed to oppose the die 52 and moved closer thereto in FIG. 14. Then, the end portion 45a of the cylindrical portion 45 is brought in contact with the outer edge of the top surface of the second punch 54. As the second punch 54 comes closer to the die 52, the end portion 45a is pressed onto the doctor blade 42 on the die 52 by the outer edge of the second punch 54.

Figure 8:
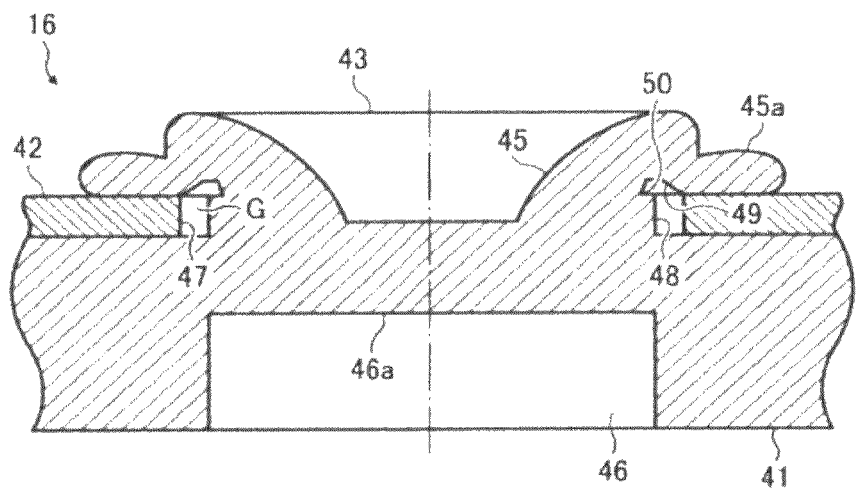
FIG. 8 is a cross sectional view of the essential part of the blade structure taken along a VIII to VIII line in FIG. 7.
Figure 15:
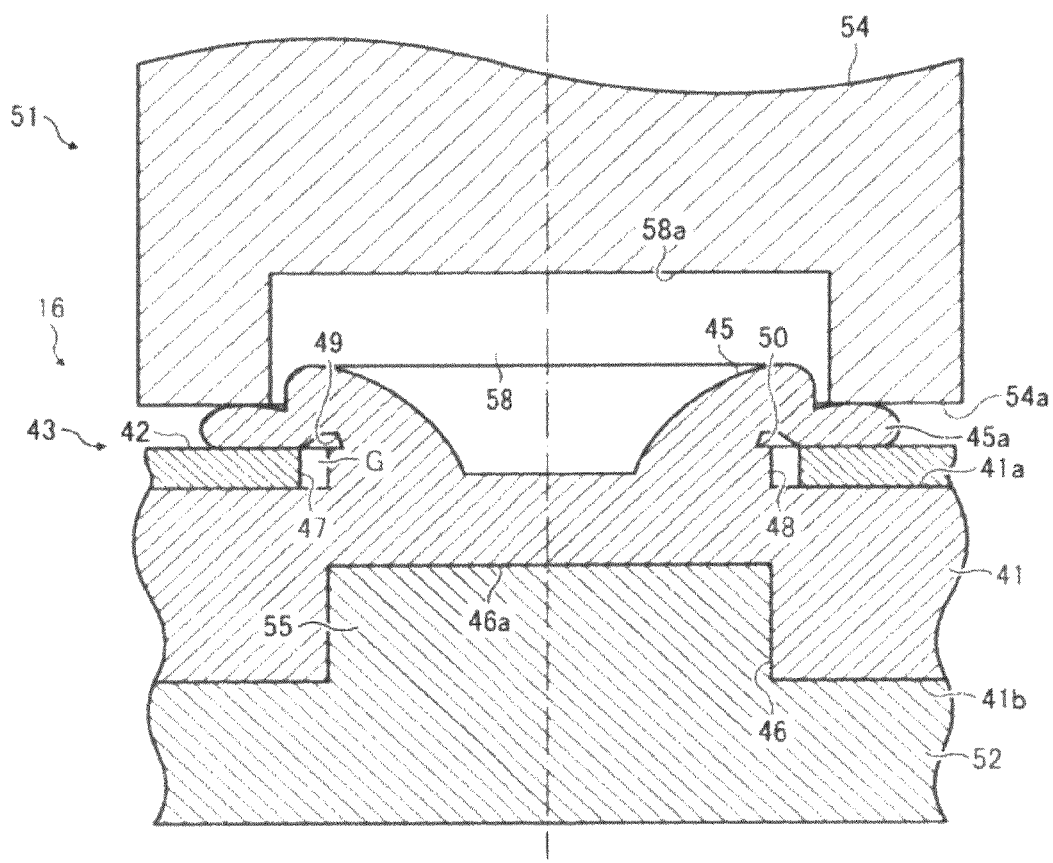
FIG. 15 is a cross sectional view of the end portion of the cylindrical portion pressed to bend towards the doctor blade by the second punch in FIG. 14.

The cylindrical portion 45 is deformed from the step 50 and its end portion 45a closely gets in contact with the doctor blade 42 as shown in FIG. 15. Then, the second punch 54 is moved away from the die 52, which plastically deforms the end portion 45a to sandwich the doctor blade 42 between the end portion 54a and the one surface 41a of the holder 41 as shown in FIG. 8. At this time, the step 50 as shown in FIG. 15 is increased in diameter as the cylindrical portion 45 is deformed, and the amount of the gap G is almost unchanged before and after molding.

The blade structure 16 is configured to attach the doctor blade 42 to the holder 41 with the fastening structures 43, and the holder 41 is fixed to the case 25 or the like.

With the blade structure set, in the develop unit 13 the developer supply unit 14 fully agitates the toner and the fixed magnetic poles absorb the developer 26 onto the outer circumference of the developer sleeve 32. By rotation of the developer sleeve 32, the developer 26 is carried to the develop area 31.

The doctor blade 42 maintains a desired amount of the developer 26, which is to be absorbed onto the photoconductor drum 8. In the develop unit 13, the developer roller 15 supports the developer 26 and carries it to the develop area 31, thereby developing an electrostatic latent image on the photoconductor drum 8 to form a toner image.

After the development, the develop unit 13 carries and drops the used developer 26 into the tank 17 by the fixed magnetic poles. The used developer 26 in the tank 17 is agitated again with other developers in the second gap 21 to be used in developing electrostatic latent images on the photoconductor drum 8.

The image formation apparatus 1 forms images on the sheets of paper 7 as follows. In the image formation apparatus 1, the charge rollers 9 evenly charge the surfaces of rotating photoconductor drums 8. With illumination with the laser beams, electrostatic latent images are formed on the photoconductor drums 8. In the develop areas 31 the electrostatic latent images are developed to form a toner image on the photoconductor drums 8 by absorbing the developer 26 onto the photoconductor drums 8 from the outer circumferences of the developer sleeves 32 of the develop units 13.

The image formation apparatus 1 carries a sheet of paper 7 via the paper feed rollers 24 of the paper feed units 3 to a gap between the photoconductor drums 8 of the process cartridges 6Y, 6M, 6C, 6K and the carrier belt 29 of the transfer unit 4. Thereby, the toner image is transferred onto the sheet of paper 7, and the fuser unit 5 fuses the toner image thereon to form a color image.

According to the present embodiment as described above, the doctor blade 42 is fastened on the holder 41 with a gap G between the outer circumference of each cylindrical portion 45 and the inner circumference of each through hole 47. Because of this gap, there is no force expanding the inner circumferences of the through holes 47 of the doctor blade 42, which can prevent undulation in the doctor blade 42 and maintain the planarity thereof. In particular, this effect is obvious in a thin doctor blade 42 of thickness of 0.5 mm or less.

Moreover, with the gap G between the outer circumference of each cylindrical portion 45 and the inner circumference of each through hole 47, even when the holder 41 and the doctor blade 42 are made of different materials with different linear expansion coefficients, it is possible to advantageously prevent distortion in the fastened portions due to the difference in linear expansion coefficients which causes the undulation in the doctor blade 42 or the loss of the planarity thereof.

Further, the peripheries of the through holes 47 of the doctor blade 42 are supported by the surfaces of the end portions 45a of the cylindrical portions 45 and the one surface 41a of the holder 41. This makes it possible to stably fix the doctor blade 42 to the holder 41 via wider fastening areas compared with a point contact, even when there is a variation in the amount of bending of the end portion 45a of the cylindrical portion 45.

Further, the doctor blade 42 can be fixed to the holder 41 by bending the end portions 45a of the cylindrical portions 45 to fasten the plurality of fastening structures in a single process, which enables reduction in the number of processes needed for fixing the doctor blade and reduction in manufacture cost thereof.

Further, since the bottom portion of the cylindrical portion 45 is sealed with the one surface 41a of the holder 41, it is possible to eliminate the necessity of specific components and processes for closing it in manufacture of the blade structure.

According to the present embodiment, each of the cylindrical portions 45 comprises the large and small diameter portions 48, 49 and the step 50 on the bottom portion. This allows the gap G between the inner circumference of the through hole 47 and the outer circumference of the cylindrical portion 45 to be maintained before and after the fastening of the fastening structure 43. This is because the cylindrical portion 45 is outwardly expanded as the end portion 45a thereof is expanded towards the outer circumferential direction from the step 50 as a starting point, and a portion of the small diameter portion is expanded by the end portion 45a bent to the doctor blade. That is, the gap G is not affected by the fastening operation. Accordingly, the through hole 47 has only to be formed in slightly larger diameter than the cylindrical portion 45. This makes it possible to prepare a larger area around the periphery of the through hole 47 for getting the end portion 45a of the cylindrical portion 45 and the holder 41 in contact with each other.

Moreover, even with an increase in the amount of the expansion of the bottom portion of the cylindrical portion 45 due to a variation in the fastening process, the doctor blade 42 is not affected by the increase. Accordingly, it is possible to stably provide blade structures with good quality as a component.

Further, according to the present embodiment, the planar shapes of the cylindrical portion 45 and the through hole 47 are the same so that the gap G therebetween can be uniformly formed in their circumferential direction. This leads to stably providing blade structures with good quality.

Further, the doctor blade 42 is fixed to the holder 41 by the fastening structures 43 according to the present embodiment. Therefore, the blade structure 16 in good planarity with no undulation can be provided.

Further, the plurality of the fastening structures 43 are provided with an interval in the longitudinal direction of the holder 41 and the doctor blade 42. This enables more uniform pressure to be applied onto the developer roller 15.

Also, the plurality of the fastening structures 43 are arranged with an equal interval in the longitudinal direction of the holder 41 and the doctor blade 42. This enables more uniform pressure to be applied onto the developer roller 15.

Further, with the blade structure of the present embodiment, it is possible to provide a develop unit with high precision in low cost. And with this develop unit 13, it is possible to provide an image formation apparatus 1 with high precision in low cost.

Next, the second embodiment of the present invention will be described with reference to FIGS. 16 to 18. Note that in the following second to eighth embodiments, the same components as in the first embodiment will be given the same numeric codes and a description thereon will be omitted.

Figure 16:
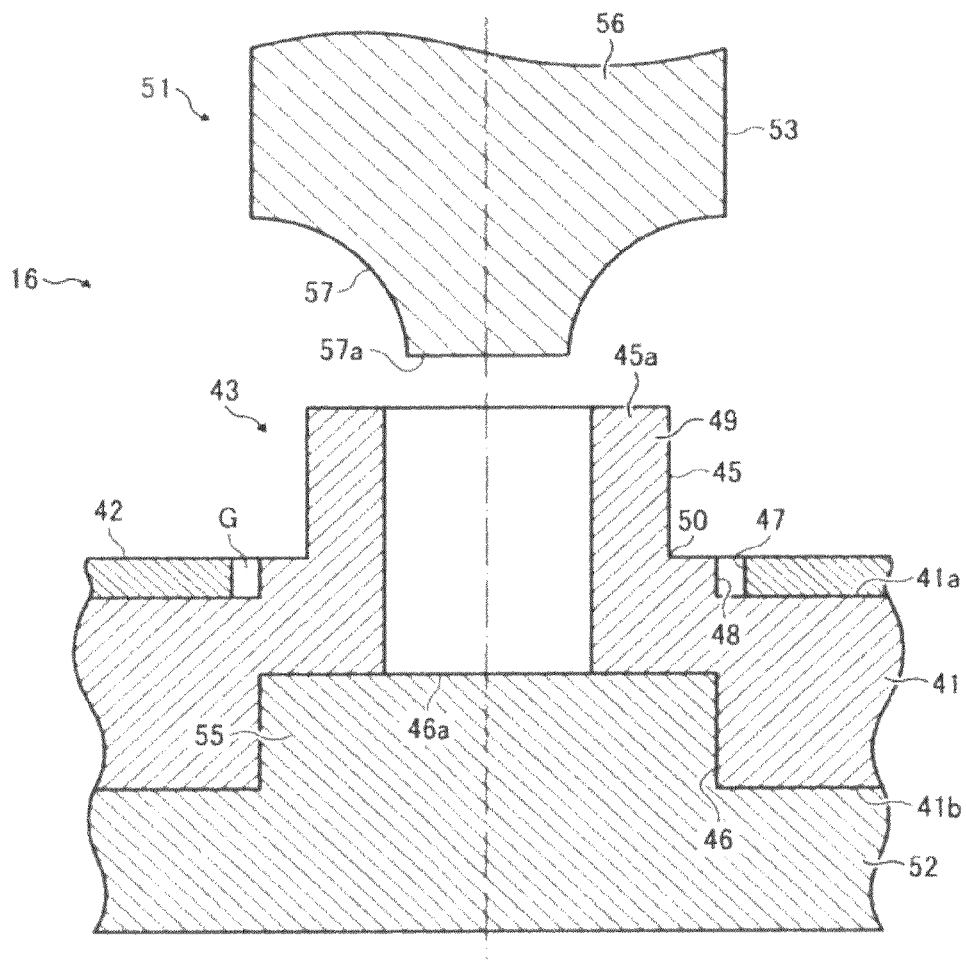
FIG. 16 is a cross sectional view of a holder and a doctor blade according to a second embodiment of the present invention positioned between the die and the first punch.
Figure 17:
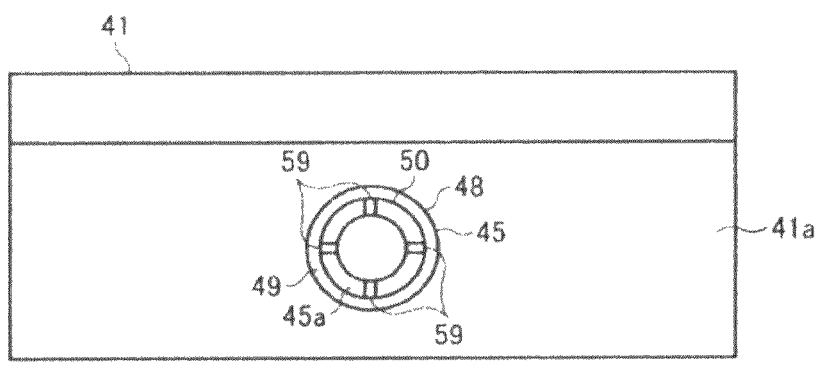
FIG. 17 is a cross sectional view of the holder and doctor blade in FIG. 16 positioned between the die and the second punch.
Figure 18:
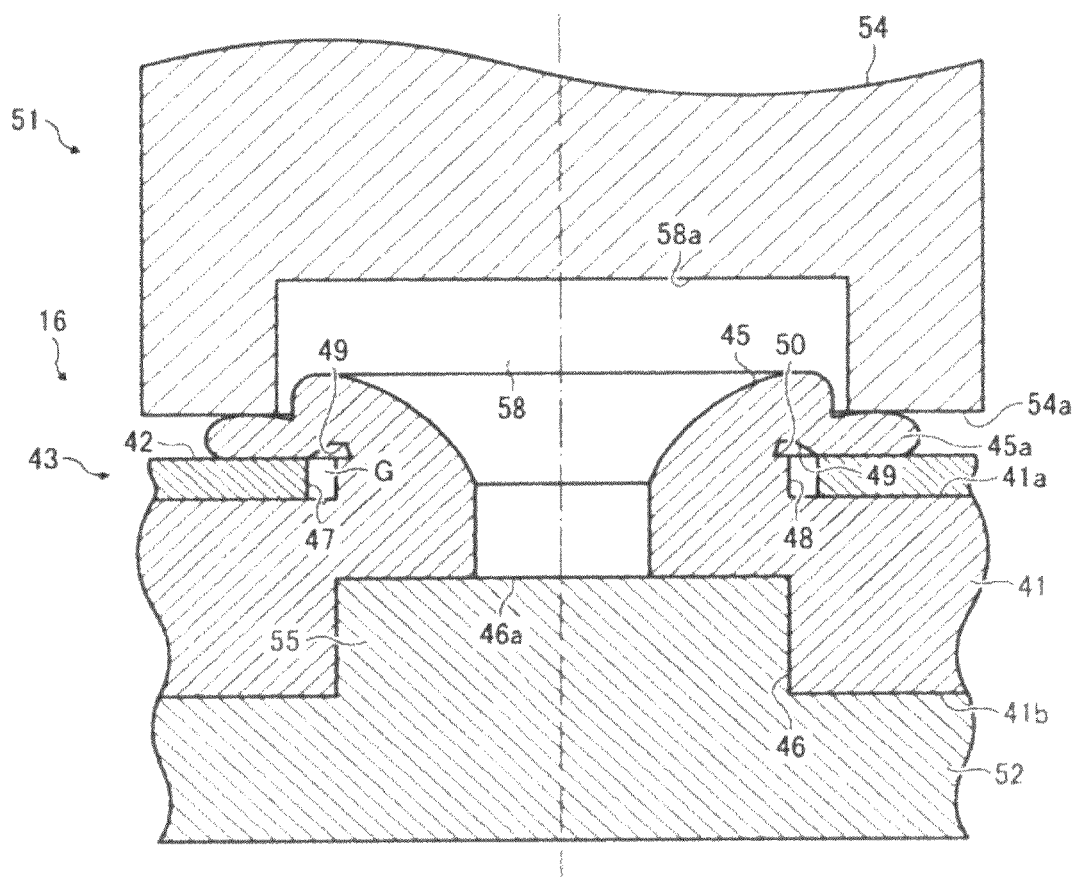
FIG. 18 is a cross sectional view of the end portion of the cylindrical portion pressed to bend towards the doctor blade by the second punch in FIG. 17.

The configuration of the present embodiment is the same as that of the first embodiment except that the cylindrical portion 45 has a tubular shape to penetrate through the holder 41 and is formed by a general extrusion as shown in FIGS. 16 to 18. Therefore, a description on the rest of the configuration will be omitted. As shown in FIG. 18, while the doctor blade 42 is fastened, the cylindrical portion 45 penetrates though the one surface 41a of the holder 41. Because of this, the blade structure according to the present embodiment needs to include another member such as a tape to seal the inner side of the cylindrical portion 45 in order to prevent a leakage of a toner therethrough.

The present embodiment achieves the same effects as the first embodiment. Moreover, the cylindrical portion 45 is molded more easily than the first embodiment. However, since this fastening structure needs to include an additional member as a tape, the numbers of manufacture processes and components of the blade structure will be increased, resulting in an increase in manufacture cost.

Figure 19:
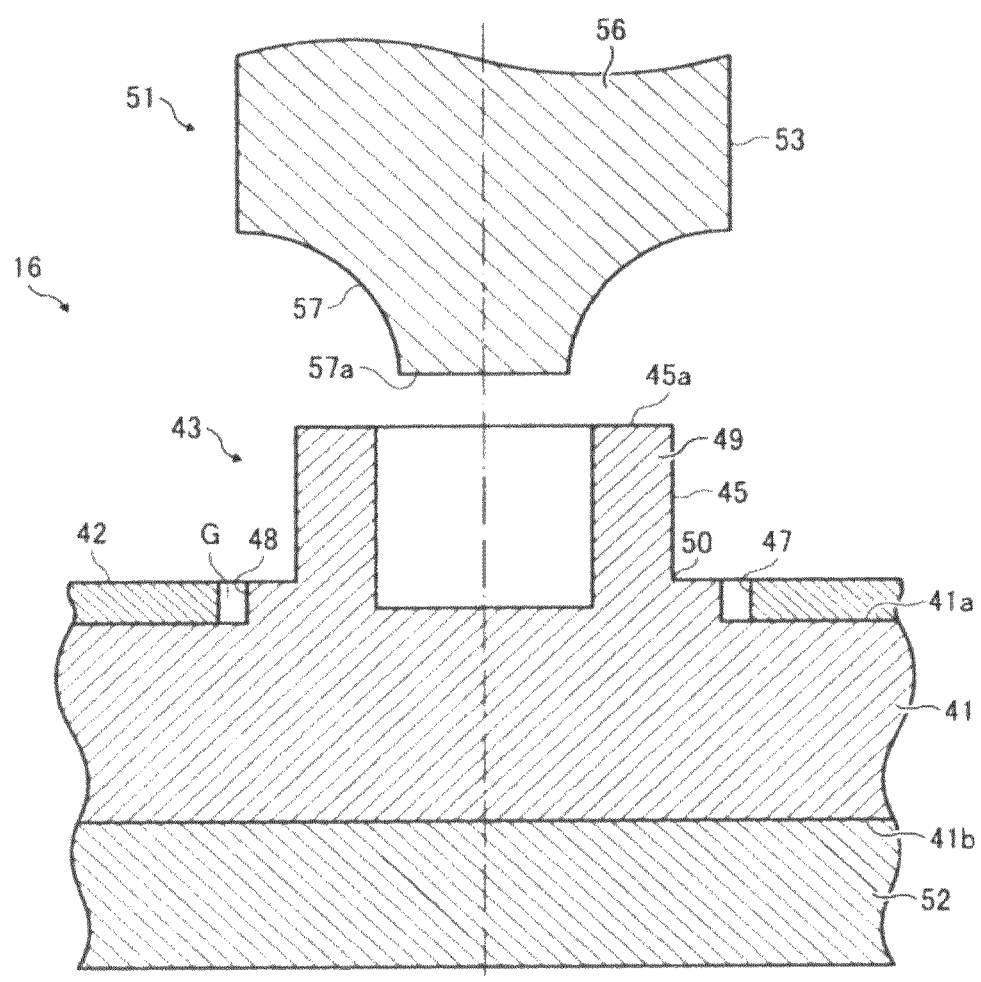
FIG. 19 is a cross sectional view of a holder and a doctor blade according to a third embodiment of the present invention positioned between the die and the first punch.
Figure 20:
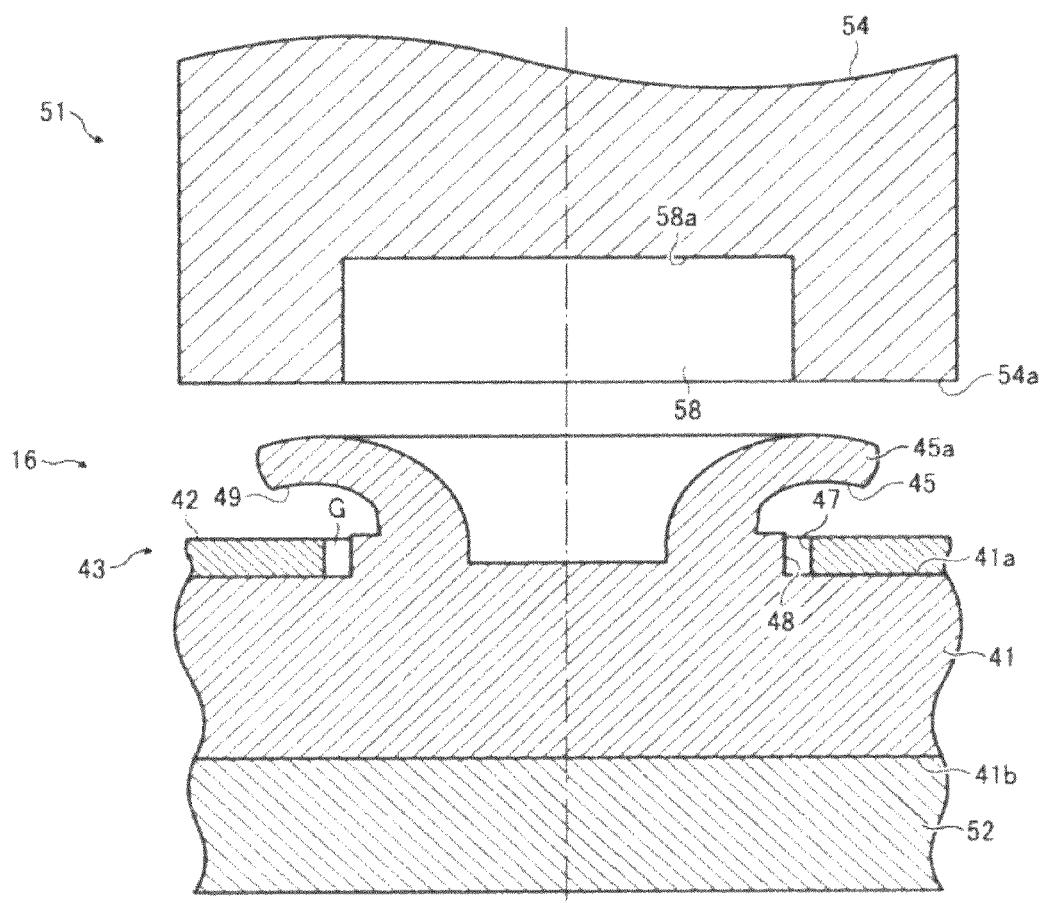
FIG. 20 is a cross sectional view of the holder and doctor blade in FIG. 19 positioned between the die and the second punch.
Figure 21:
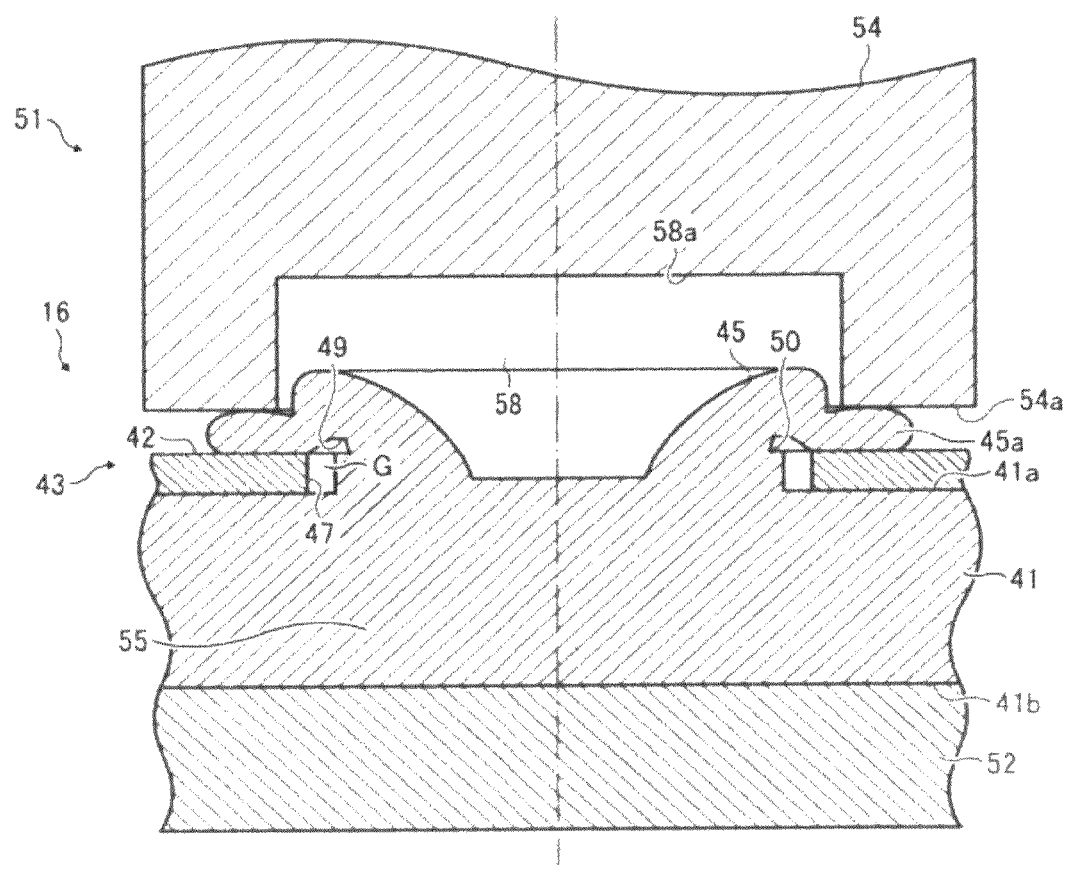
FIG. 21 is a cross sectional view of the end portion of the cylindrical portion pressed to bend towards the doctor blade by the second punch in FIG. 20.

Next, the third embodiment of the present invention will be described with reference to FIGS. 19 to 21.

The third embodiment describes an example in which the cylindrical portion 45 is formed by not extrusion but cutting process. The present embodiment is different from the first embodiment that the columnar concave portion 46 is not provided. The rest of the configuration is the same as that of the first embodiment and a description thereon is omitted. The present embodiment achieves the same advantageous effects as the first embodiment.

Figure 22:
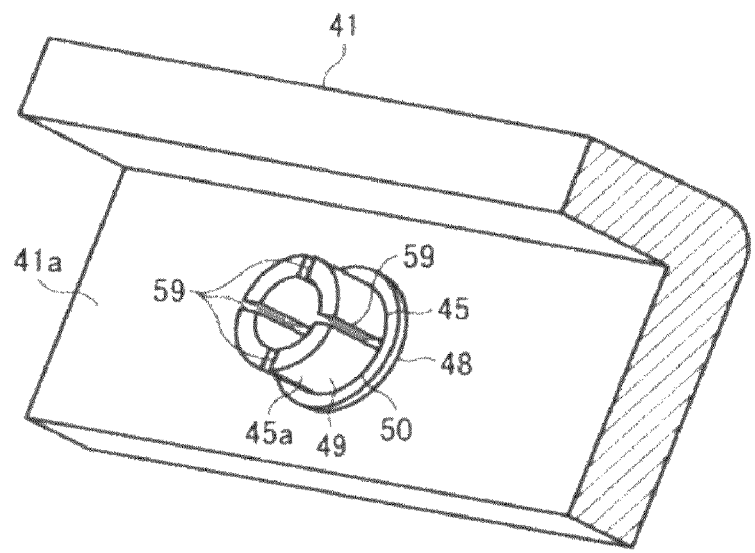
FIG. 22 is a perspective view of a cylindrical portion of a blade structure before molded according to a fourth embodiment of the present invention.
Figure 23:
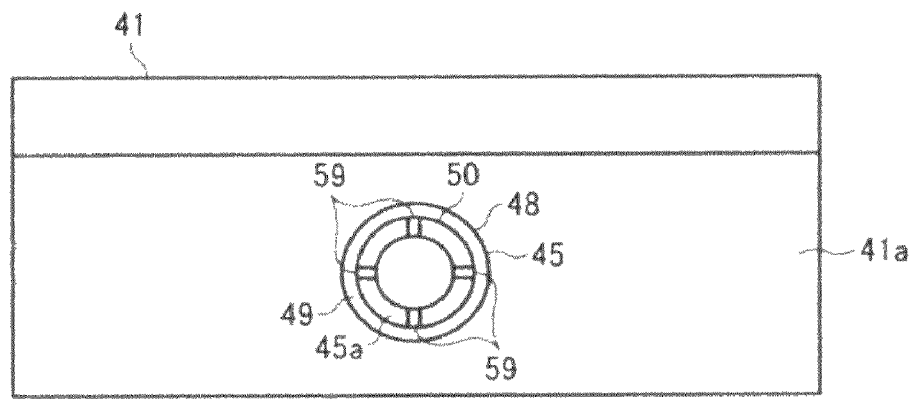
FIG. 23 is a front view of the cylindrical portion of the blade structure in FIG. 22.

The fourth embodiment of the present invention will be described with reference to FIGS. 22, 23.

In the fourth embodiment, the cylindrical portion 45 is configured to include a plurality of slits 59 extending in a direction perpendicular to the one surface 41a of the holder 41. It is preferable that the slits 59 are disposed with an equal interval in the circumferential direction of the cylindrical portion 45. In the drawings the number of slits is 4 and they are arranged with an equal interval in the circumferential direction of the cylindrical portion 45. The rest of the configuration is the same as that of the first embodiment and a description 20 thereon is omitted.

According to the present embodiment, with the provisions of the slits 59, it is possible to form the cylindrical portion 45 with a simple machine since the end portion 45a of the cylindrical portion 45 can be easily expanded and easily machined, requiring less force for plastic deformation of the cylindrical portion 45.

Figure 24:
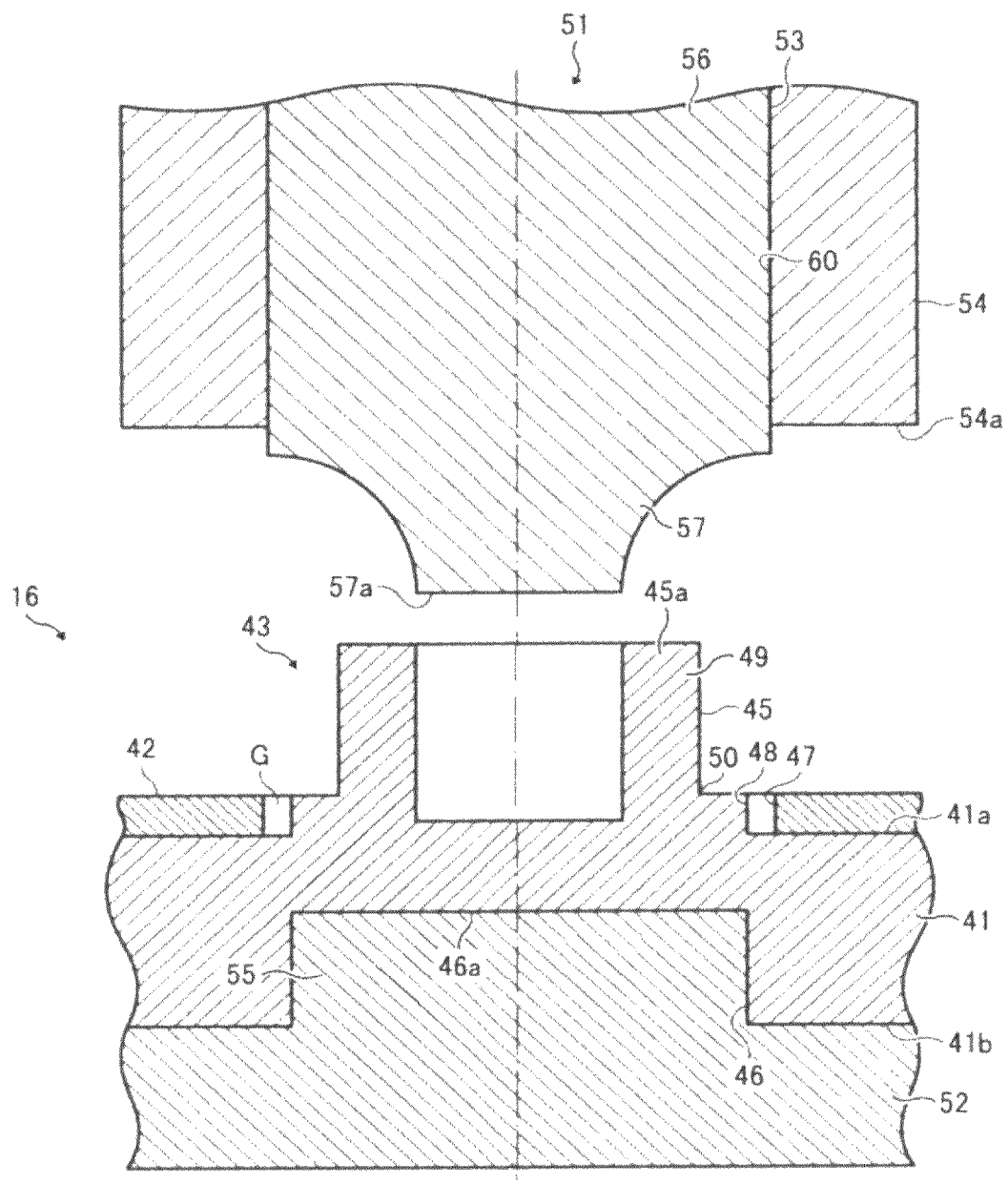
FIG. 24 is a cross sectional view of a holder and a doctor blade according to a fifth embodiment of the present invention positioned between the die and the first punch.
Figure 25:
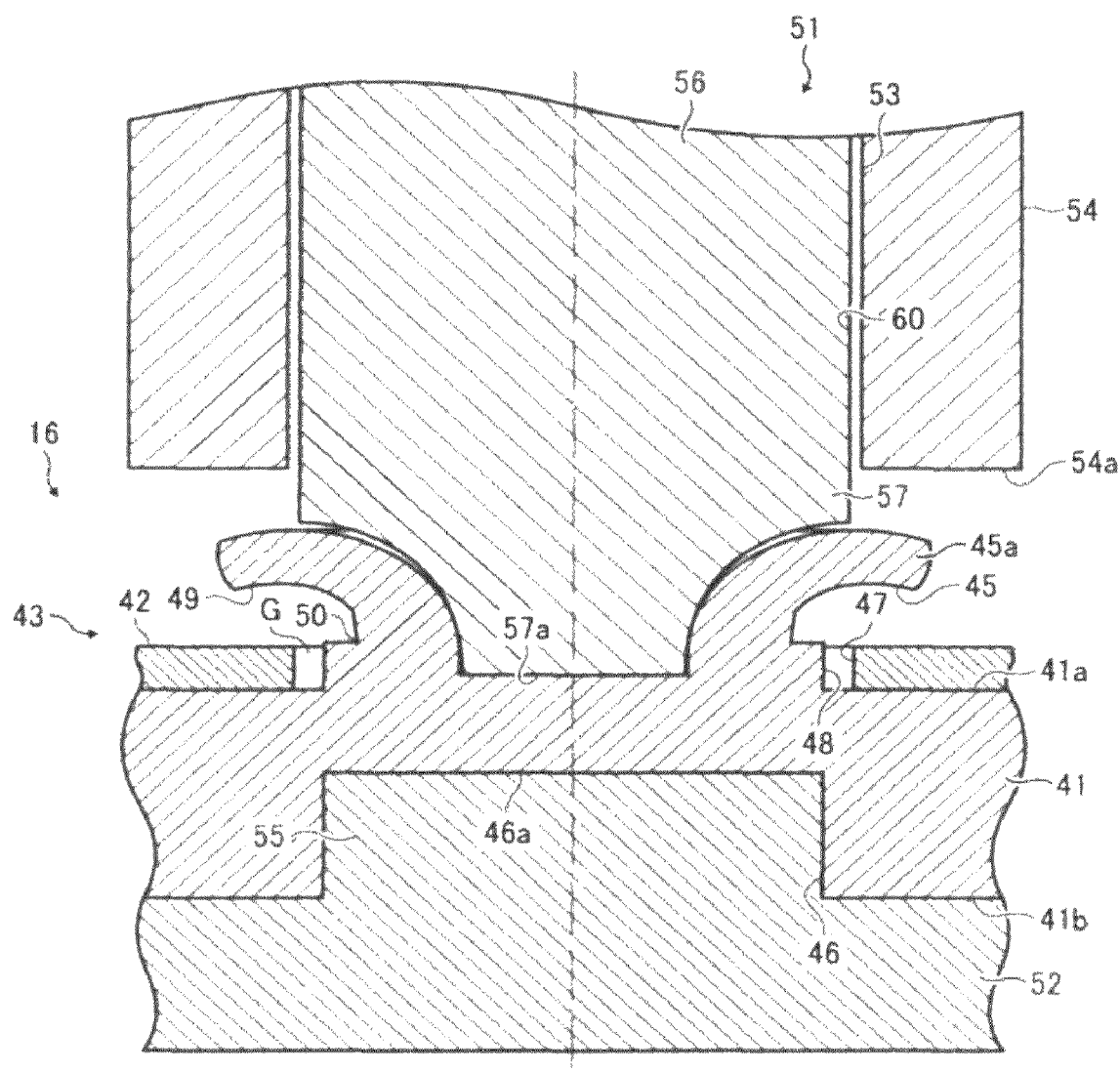
FIG. 25 is cross sectional view of the end portion of the cylindrical portion expanded by the first punch in FIG. 24.
Figure 26:
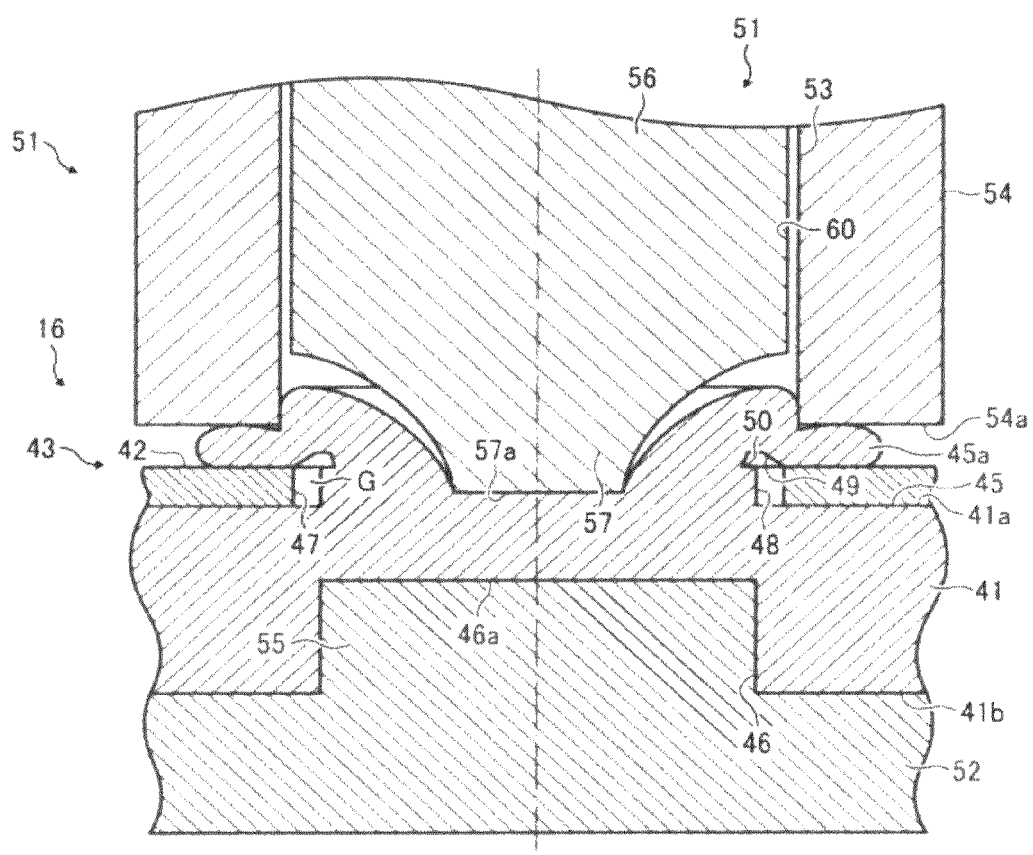
FIG. 26 is a cross sectional view of the end portion of the cylindrical portion pressed to bend towards the doctor blade by the second punch in FIG. 25.

Next, the fifth embodiment of the present invention will be described with reference to FIGS. 24 to 26.

In the fifth embodiment, the second punch 54 is configured to additionally include a groove 60 through which the first punch 53 is inserted in order to integrally form the first and second punches 53, 54. As shown in FIGS. 24 to 26, both of the first and second punches 53, 54 get closer to the die 52 to expand the end portion 45a of the cylindrical portion 45 and bend it towards the doctor blade 42 continuously. According to the present embodiment, with the integrated first second punches 53, 54, the die set 51 has a mechanism to adjust timing for molding. The present embodiment can achieve the same advantageous effects as the first embodiment.

The sixth embodiment of the present invention will be described with reference to FIGS. 27 to 29.

In the present embodiment, the cylindrical portion 45 is configured not to include the step 50 and the large and small diameter portions 48, 49 with different outer diameters. Instead, the outer diameter of the cylindrical portion 45 is formed in a constant thickness over the entire circumference.

Figure 27:
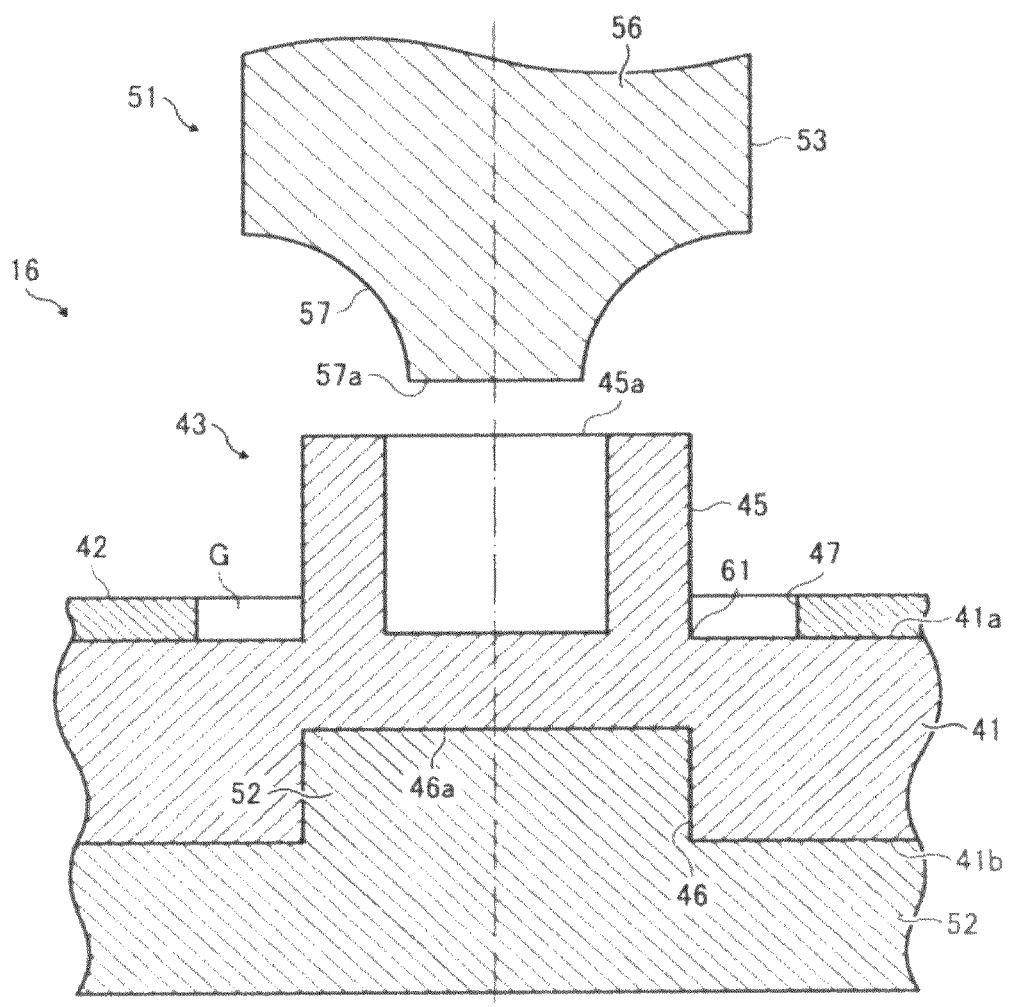
FIG. 27 is a cross sectional view of a holder and a doctor blade according to a sixth embodiment of the present invention positioned between the die and the first punch.
Figure 28:
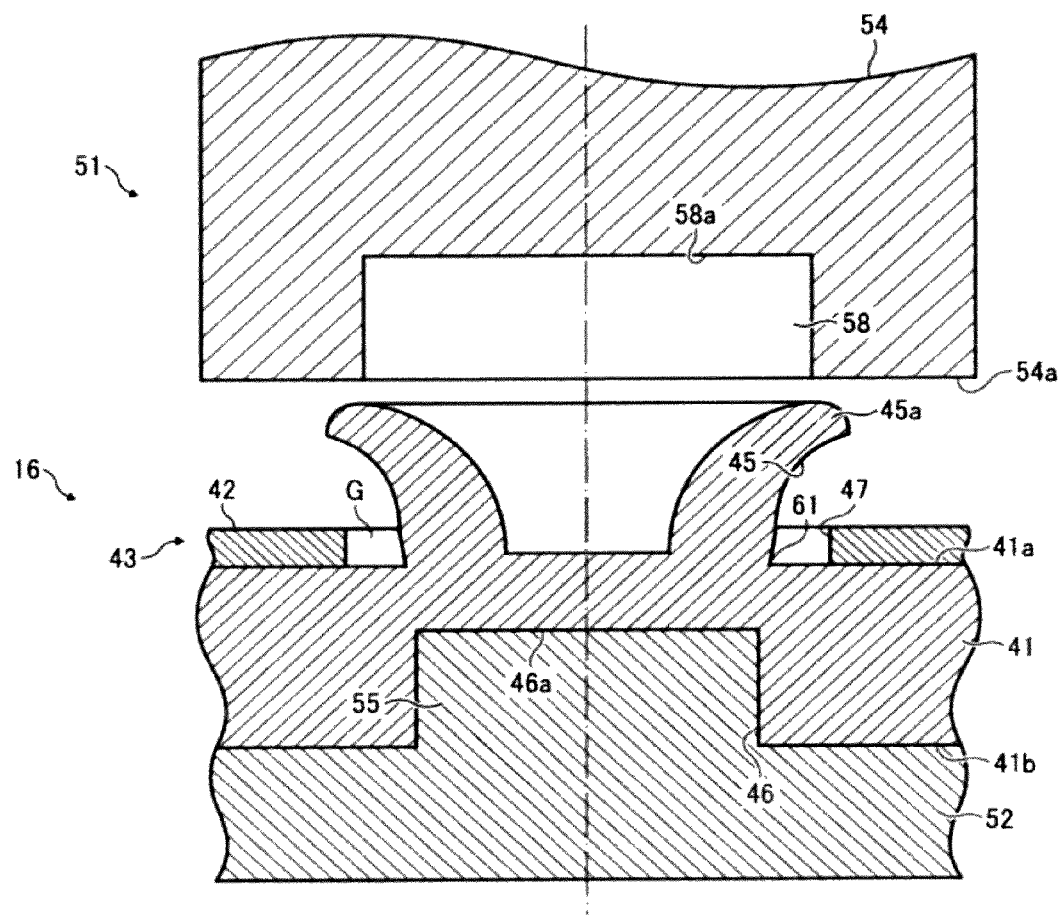
FIG. 28 is a cross sectional view of the holder and doctor blade in FIG. 27 positioned between the die and the second punch.

FIG. 27 shows an example in which the end portion 45a of the cylindrical portion 45 is expanded in the outer circumferential direction using the first punch 53 and die 54 of the die set 51. At this time, the cylindrical portion 45 is deformed from an intersection 61 of the cylindrical portion 45 and the holder 41 as a starting point. The intersection 61 is expanded along with the deformation of the cylindrical portion 45 as shown in FIG. 28, which reduces the amount of the gap G compared with that before molding.

Figure 29:
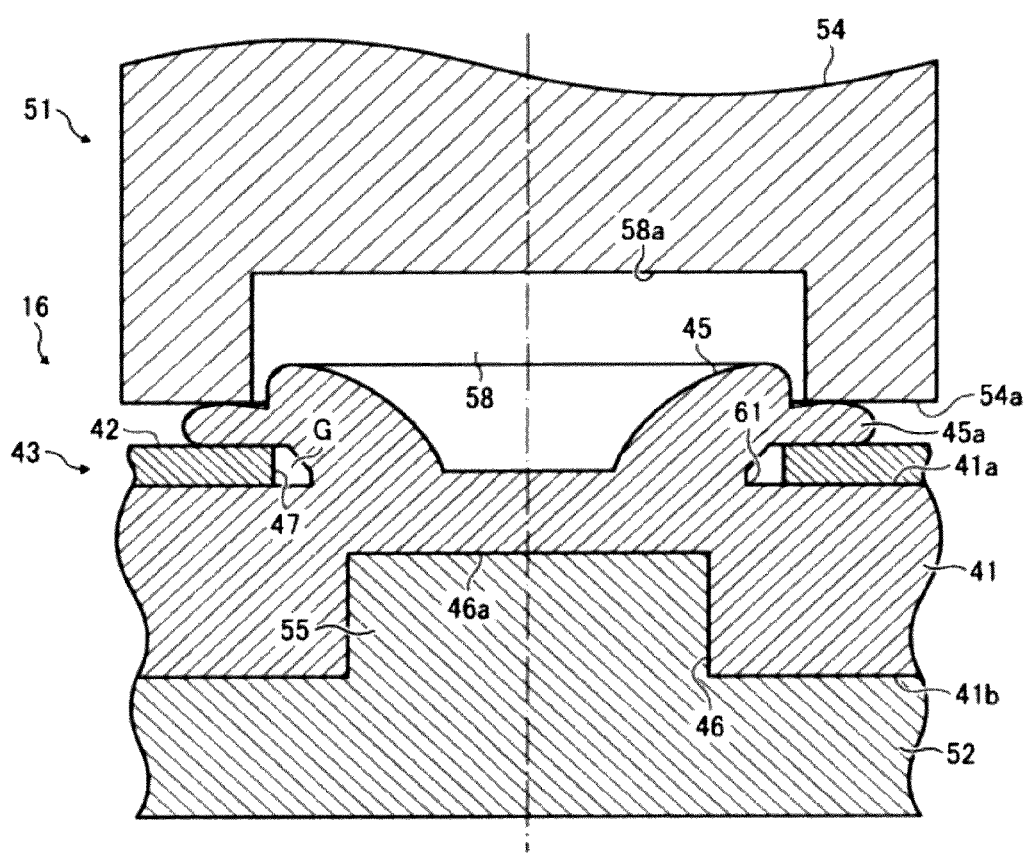
FIG. 29 is a cross sectional view of the end portion of the cylindrical portion pressed to bend towards the doctor blade by the second punch in FIG. 28.

Further, FIG. 29 shows an example in which the end portion 45a of the cylindrical portion 45 is bent towards the doctor blade 42 using the second punch 54 and the die 52 of the die set 51. While the cylindrical portion 45 is deformed from the intersection 61 as a starting point, the end portion 41a is also deformed to sandwich the doctor blade 42 between the end portion 41 a and the holder 41. This completes the molding. At this time, the intersection 61 is further expanded along with the deformation of the cylindrical portion 45. Accordingly, the gap G is further reduced in FIG. 29.

In the present embodiment, to maintain the gap G after completion of the molding, the inner diameter of the through hole 47 of the doctor blade 42 is set to be larger than that in the first embodiment. Because of this, an area in which the end portion 45a and the doctor blade 42 contact with each other is reduced.

Figure 30:
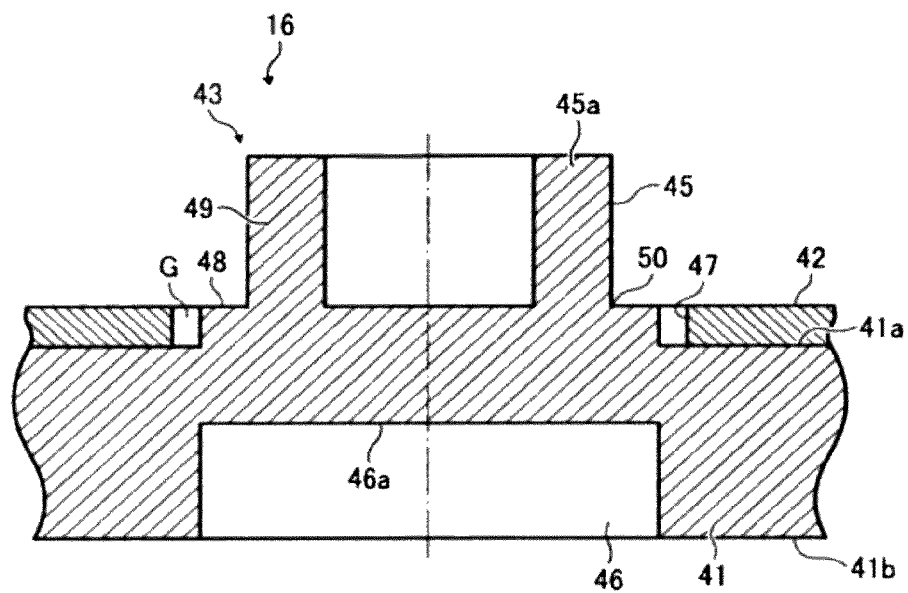
FIG. 30 is a holder and a doctor blade according to a seventh embodiment of the present invention.
Figure 31:
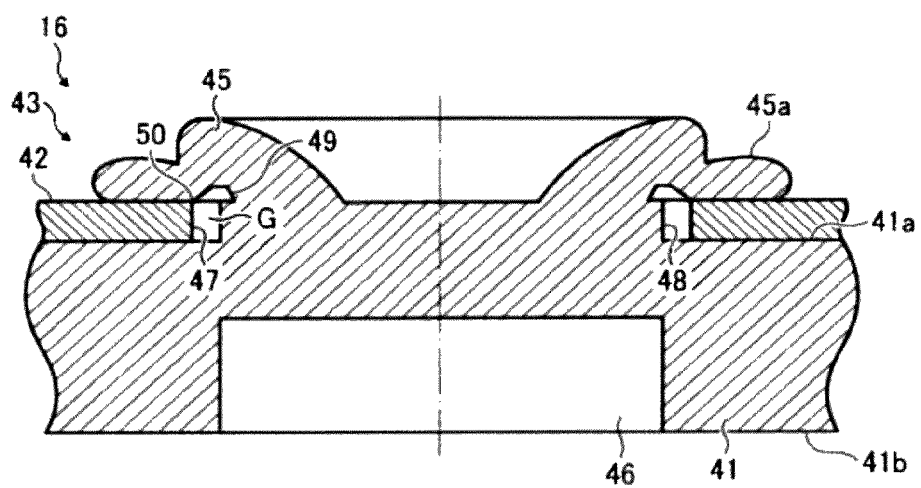
FIG. 31 is a cross sectional view of the end portion of the cylindrical portion in FIG. 30 expanded and then pressed to bend towards the doctor blade.

Next, the seventh embodiment of the present invention will be described with reference to FIGS. 30, 31.

In the present embodiment, the large diameter portion 48 is formed in a columnar (disc) shape. This makes the pressing force of the end portion 45a of the cylindrical portion 45 uniform so that the doctor blade can be supported with a high precision. The cylindrical portion 45 can be also provided with the slits 59 in the present embodiment. Note that this large diameter portion 48 corresponds to a columnar portion and the small diameter portion 49 corresponds to a tubular portion.

The eighth embodiment of the present invention will be described with reference to FIGS. 32 to 34.

Figure 32:
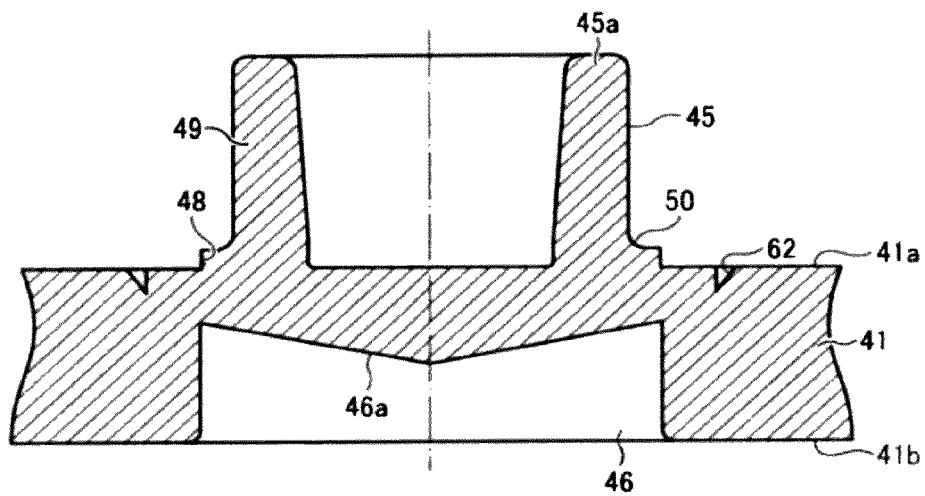
FIG. 32 is a cross sectional view of a holder according to an eighth embodiment of the present invention.

According to the present embodiment, a concave groove 62 is additionally provided in the one surface 41a of the holder 41, and the bottom surface 46a of the columnar concave portion 46 is formed to be inclined towards the outer circumference so that the thickness of the holder 41 gradually decreases as shown in FIG. 32.

The concave groove 62 has a ring-like shape to position the cylindrical portion 45. The concave groove 62 and cylindrical portion 45 are coaxially placed. The columnar concave portion 46 corresponds to a taper concave portion.

The cylindrical portion 45 according to the present embodiment is extruded by a second die set 63 which comprises a first bottom die 64 in a columnar shape, a second bottom die 65 in a plate-like shape, and a top die 66, and a drive mechanism to drive the dies 64, 65, 66 to get close to/distance away from each other.

The top surface of the first bottom die 64 includes a taper surface 67 to be along the outer diameter of the bottom surface 46a of the columnar concave portion 46. The second bottom die 65 includes a through hole 68 through which the first bottom die 64 slides. The bottom surface of the top die 66 facing the bottom dies 64, 65 includes a molding portion 69 to mold the outer form of the cylindrical portion 45 and a wedge portion 70. The molding portion 69 has an open bottom end and penetrates through the top die 66. The wedge portion 70 has a ring-like shape to position the molding portion 69.

Figure 33:
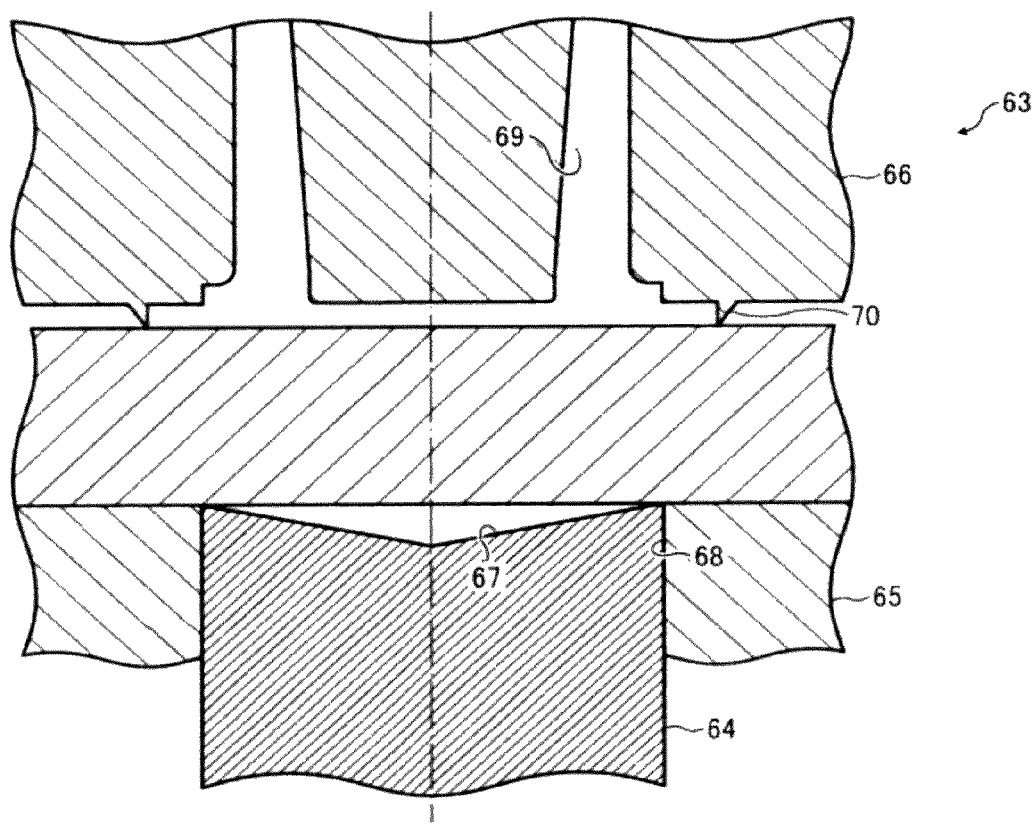
FIG. 33 is a cross sectional view of base materials of the holder in FIG. 32 placed between dies.
Figure 34:
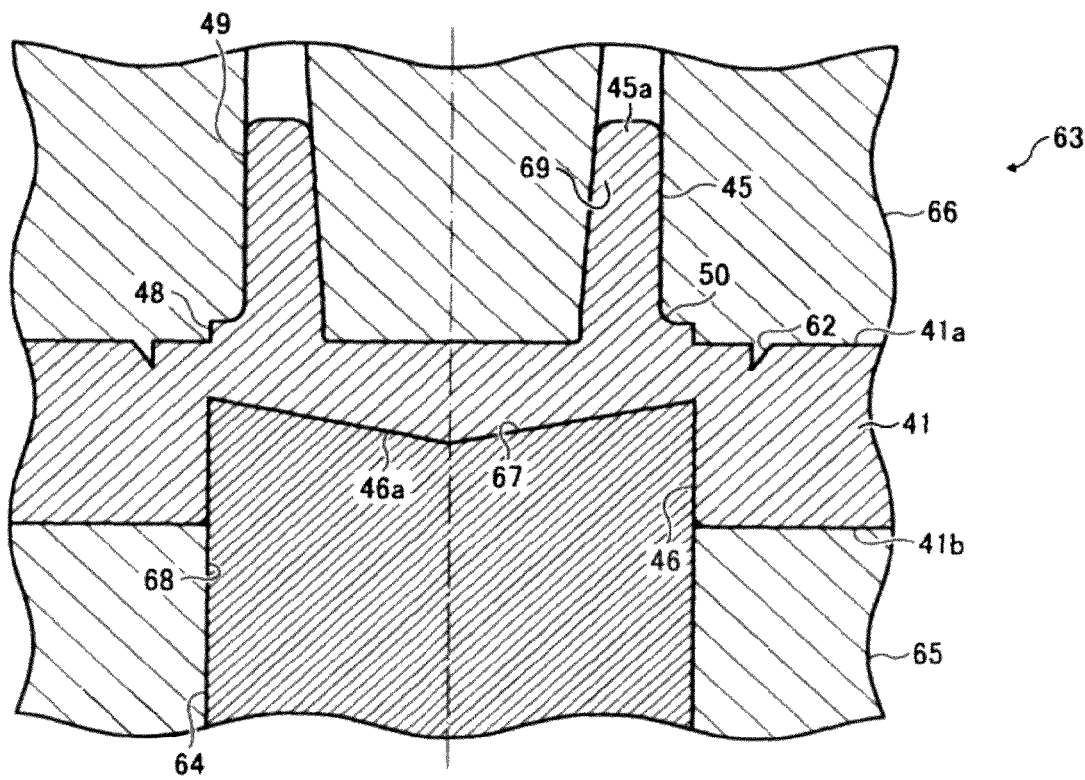
FIG. 34 is a cross sectional view of the cylindrical portion molded by getting the dies in FIG. 33 closer to each other.
Figure 35:
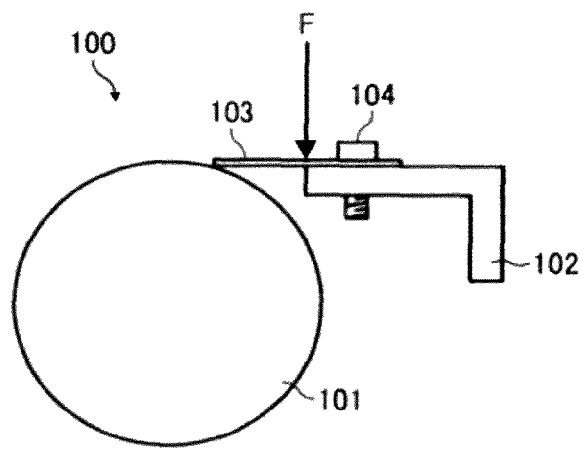
FIG. 35 is a side view of an essential part of a develop unit comprising a prior art blade structure.
Figure 36:
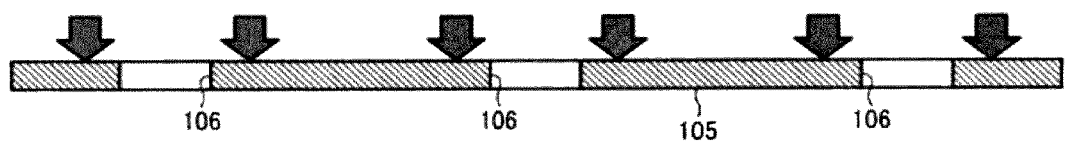
FIG. 36 shows an example of how stress is applied to a doctor blade of the blade structure in FIG. 35.
Figure 37:
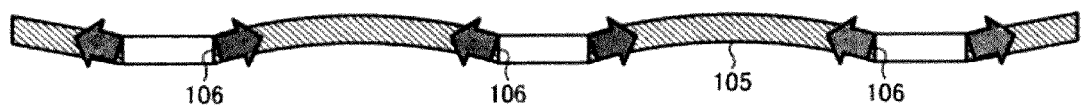
FIG. 37 shows another example of how stress is applied to the doctor blade of the blade structure in FIG. 35.

In the die set 63 as shown in FIG. 33, a base material of the holder 41 is placed on the bottom dies 64, 65 and the top die 66 is placed on the base material. In FIG. 34, the first bottom die 64 is raised to form the columnar concave portion 46 and the top die 66 is fallen to form the concave groove 62 and the cylindrical portion 45. The wedge portion 70 and the outer edge of the taper surface 67 prevent the base material of the holder 41 from flowing from the molding portion 69.

According to the present embodiment, with the concave groove 62 formed inside the one surface 41a of the holder 41, it is possible to prevent the base material of the holder 41 from flowing to the outer circumferential direction of the cylindrical portion 45 so that the cylindrical portion 45 can be formed integrally with the holder 41 and protrude properly without supporting the holder 41 between the dies 64, 65, 66 with a very strong force. This eliminates molding failures and leads to preventing undulation of the doctor blade 42 in attaching the doctor blade to the holder 41.

Further, according to the present embodiment, the columnar concave portion 46 is provided at the back side of the cylindrical portion 45 to gradually reduce the thickness of the holder 41 towards the outer circumferential direction. Because of this, it is possible to prevent the base material of the holder 41 from flowing to the outer circumferential direction of the cylindrical portion 45 so that the cylindrical portion 45 can be formed integrally with the holder 41 and protrude properly without supporting the holder 41 between the dies 64, 65, 66 with a very strong force. This eliminates molding failures and leads to preventing undulation of the doctor blade 42 in attaching the doctor blade to the holder 41. The slits 59 can be also provided in the cylindrical portion 45 in the present embodiment.

According to the present embodiment, the holder 41 is configured to include both the concave groove 62 and the columnar concave portion 46. However, the present invention is not limited thereto. The holder 41 can be configured to include at least either of them.

Moreover, according to the present embodiment, the cylindrical portion 45 is a cylinder and the planar shape of the through holes 47 is circular. Although the present invention is not limited thereto, the cylindrical portion is preferably in a cylindrical form since stress is uniformly applied thereto when it is deformed, it can be precisely molded.

According to the above embodiments, the planar shape of the cylindrical portion 45 and that of the through hole 47 are set to be the same and the through hole 47 is relatively larger in size than the cylindrical portion 45. Although the present invention is not limited thereto, this is preferable since the areas around the through holes 47 of the doctor blade 42 are made uniform and the doctor blade 42 can be stably fastened.

According to the above embodiments, the blade structure is configured to include 12 fastening structures 43 arranged with an equal interval. The present invention is not limited thereto. The number of fastening structures 43 should be at least 2 or more and the interval with which they are arranged is not necessary to be equal. However, it is preferable that the interval be constant since pressing force to the doctor blade 42 in axial direction of the developer sleeve 32 can be uniform.

According to the above embodiments, the thickness of the large diameter portion 48 and that of the doctor blade 42 are set to be substantially equal. However, the thickness of the large diameter portion 48 is not limited thereto, and it should be equal to or larger than that of the doctor blade 42.

According to the above embodiments, the image formation apparatus 1 is configured to include process cartridges 6Y, 6M, 6C, 6K each comprising a cartridge case 11, a charge roller 9, a photoconductor drum 8, a cleaning blade 12 and a develop unit 13. However, the present invention is not limited thereto. The process cartridges can be comprised of at least the develop unit 13, and the other components are omissible. Further, the image formation apparatus 1 needs to comprise the develop unit 13 only. The process cartridges 6Y, 6M, 6C, 6K are omissible.

Further, according to the above embodiments, the developer 26 is of a one-component type containing a toner only as a way of example. However, the present invention is not limited thereto. The present invention is applicable to an image formation apparatus using a two-component type developer containing a toner and a magnetic carrier.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A fastening structure for fixing a plate-like member to a holder, comprising:
    a cylindrical portion provided on one surface of the holder with which a plate-like member is overlapped;
    a through hole having an inner diameter larger than an outer diameter of the cylindrical portion and penetrating through the plate-like member; and
    a concave groove formed in a ring-like shape on the one surface of the holder and receiving the cylindrical portion, wherein
    while the cylindrical portion is inserted through the through hole with a gap between an outer circumference of the cylindrical portion and an inner circumference of the through hole, an end portion of the cylindrical portion is pressed to be expanded in an outer circumferential direction and then bent towards the plate-like member, to thereby fix the plate-like member to the holder by supporting the plate-like member between the end portion and the one surface of the holder.

2. A fastening structure according to claim 1, wherein the cylindrical portion is in a cylindrical form and stands from the one surface of the holder, and a bottom portion of the cylindrical portion is sealed with the one surface.

3. A fastening structure according to claim 1, wherein the cylindrical portion comprises a large diameter portion connected with the one surface of the holder and facing the inner circumference of the through hole with a gap, and a small diameter portion connected with the large diameter portion and having a smaller diameter than that of the large diameter portion.

4. A fastening structure according to claim 1, wherein the cylindrical portion comprises a columnar portion connected with the one surface of the holder and facing the inner circumference of the through hole with a gap, and a tubular portion connected with the columnar portion.

5. A fastening structure according to claim 1, wherein a planar shape of the cylindrical portion and that of the through hole are the same.

6. A fastening structure according to claim 1, wherein the cylindrical portion includes a slit extending in a direction intersecting with the one surface of the holder.

7. A fastening structure according to claim 1, further comprising:
    a taper concave portion on a back side of the cylindrical portion, to decrease a thickness of the holder gradually in the outer circumference direction.

8. A blade structure comprising:
    the fastening structure according to claim 1;
    a long holder; and
    a long thin plate-like blade as a plate-like member overlapped with one surface of the holder.

9. A blade structure according to claim 8, further comprising:
    a plurality of the fastening structures with an interval in a longitudinal direction of the holder and the thin plate-like blade.

10. A blade structure according to claim 9, wherein the plurality of the fastening structures are provided in the longitudinal direction of the holder and the thin plate-like blade with an equal interval.

11. A develop unit comprising:
    a developer roller absorbing a developer onto its outer circumference and delivering the developer to a develop area opposing an image support body; and
    the blade structure according to claim 8 which maintains a certain thickness of the developer on the outer circumference of the developer roller.

12. An image formation apparatus comprising:
    an image support body; and
    the develop unit according to claim 11.

13. A fastening structure for fixing a plate-like member to a holder, comprising:
    a cylindrical portion provided on one surface of the holder with which a plate-like member is overlapped;
    a through hole having an inner diameter larger than an outer diameter of the cylindrical portion and penetrating through the plate-like member; and
    a taper concave portion on a back side of the cylindrical portion, to decrease a thickness of the holder gradually in the outer circumference direction, wherein
    while the cylindrical portion is inserted through the through hole with a gap between an outer circumference of the cylindrical portion and an inner circumference of the through hole, an end portion of the cylindrical portion is pressed to be expanded in an outer circumferential direction and then bent towards the plate-like member, to thereby fix the plate-like member to the holder by supporting the plate-like member between the end portion and the one surface of the holder.

* * * * *